US011144699B2

United States Patent
Nam et al.

(10) Patent No.: US 11,144,699 B2
(45) Date of Patent: Oct. 12, 2021

(54) METHOD IMPLEMENTED ON COMPUTER SYSTEM EXECUTING INSTRUCTIONS FOR SEMICONDUCTOR DESIGN SIMULATION

(71) Applicant: Samsung Electronics Co., Ltd., Suwon-si (KR)

(72) Inventors: Seungki Nam, Seongnam-si (KR); Jungil Son, Hwaseong-si (KR); Sungwook Moon, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/018,262

(22) Filed: Sep. 11, 2020

(65) Prior Publication Data
US 2021/0264089 A1    Aug. 26, 2021

(30) Foreign Application Priority Data

Feb. 25, 2020    (KR) .................. 10-2020-0023061

(51) Int. Cl.
*G06F 30/00*    (2020.01)
*G06F 30/392*   (2020.01)
*G06F 30/39*    (2020.01)

(52) U.S. Cl.
CPC ............ *G06F 30/392* (2020.01); *G06F 30/39* (2020.01)

(58) Field of Classification Search
CPC ............................. G06F 30/392; G06F 30/39
See application file for complete search history.

(56) References Cited

U.S. PATENT DOCUMENTS

| | | | | |
|---|---|---|---|---|
| 5,666,288 A * | 9/1997 | Jones | .................. | G06F 30/327 716/55 |
| 6,292,766 B1 * | 9/2001 | Mattos | .................. | G06F 30/367 703/14 |
| 6,952,814 B2 | 10/2005 | Joseph et al. | | |
| 7,016,794 B2 * | 3/2006 | Schultz | .................. | G06F 30/367 702/64 |
| 7,117,467 B2 | 10/2006 | Ali et al. | | |
| 7,131,094 B2 | 10/2006 | Kolk et al. | | |
| 7,581,198 B2 * | 8/2009 | Huynh | .................. | G06F 30/392 716/119 |
| 7,596,773 B2 * | 9/2009 | Meyyappan | .......... | G06F 30/392 716/119 |
| 7,725,866 B2 | 5/2010 | Kobayashi et al. | | |
| 7,818,157 B2 * | 10/2010 | Schultz | ................ | G06F 30/367 703/14 |
| 8,056,033 B2 * | 11/2011 | Nakashima | .......... | G06F 30/367 716/108 |
| 8,214,790 B2 * | 7/2012 | Masleid | ................ | G06F 30/394 716/139 |

(Continued)

FOREIGN PATENT DOCUMENTS

KR    1020170042119 A    4/2017

*Primary Examiner* — Naum Levin
(74) *Attorney, Agent, or Firm* — Muir Patent Law, PLLC

(57) ABSTRACT

Disclosed is a method implemented with a computer system executing instructions for a semiconductor design simulation. The method includes generating a plurality of floor plans placing a plurality of circuit blocks differently, generating a plurality of power models from the plurality of floor plans, and selecting a layout corresponding to one of the plurality of floor plans by selecting at least one power model satisfying system requirements from among the plurality of power models.

20 Claims, 25 Drawing Sheets

(56) References Cited

U.S. PATENT DOCUMENTS

| | | |
|---|---|---|
| 8,327,306 B2 | 12/2012 | Oh et al. |
| 8,386,229 B1 | 2/2013 | Anderson et al. |
| 8,392,862 B1 * | 3/2013 | Siguenza .............. G06F 30/327 |
| | | 716/120 |
| 8,656,333 B1 | 2/2014 | Bishop et al. |
| 8,914,764 B2 | 12/2014 | Bose et al. |
| 9,135,390 B2 | 9/2015 | Jang et al. |
| 10,289,796 B2 * | 5/2019 | Rossi .................... H01L 27/108 |
| 10,445,457 B1 * | 10/2019 | Loo ........................ G06F 30/392 |
| 10,460,062 B2 * | 10/2019 | Feld ........................ G06F 30/18 |
| 10,482,210 B2 * | 11/2019 | Wang .................... G06F 30/392 |
| 10,558,780 B1 * | 2/2020 | Kukal ................... G06F 30/398 |
| 10,808,333 B2 * | 10/2020 | Ito ......................... G06F 30/327 |
| 2006/0218514 A1 | 9/2006 | Uchida |
| 2009/0150138 A1 * | 6/2009 | Kobayashi ............ G06F 30/367 |
| | | 703/14 |
| 2018/0157782 A1 * | 6/2018 | Rossi ................. H01L 25/0655 |
| 2020/0380188 A1 * | 12/2020 | MacRae ................. G06F 30/31 |
| 2020/0380191 A1 * | 12/2020 | MacRae ............... G06F 30/367 |

* cited by examiner

FIG. 17

```
Netlist generation
L_6_33_2      n_6_33_2     port670  9e-11
R_14_33 prot666 n_14_33    0.003
L_14_33 n_14_33 port667    9e-11
R_14_33_2    port666 n_14_33_2    0.006
L_14_33_2    n_14_33_2    port676  1.8e-10
R_15_33 port667 n_15_33    0.003
L_15_33 n_15_33 port668    9e-11
R_15_33_2    port667 n_15_33_2    0.003
L_15_33_2    n_15_33_2    port671  9e-11
R_16_33 port668 n_16_33    0.003
L_16_33 n_16_33 port669    9e-11
R_6_34_2     port670 n_6_34_2     0.003
L_6_34_2     n_6_34_2     port672  9e-11
R_15_34_2    port671 n_15_34_2    0.003
L_15_34_2    n_15_34_2    port678  9e-11
R_6_35_2     port671 n_15_35_2    0.003
L_6_35_2     n_6_35_2     port679  9e-11
R_11_35 port673 n_11_35    0.003
L_11_35 n_11_35 port674    9e-11
R_11_35_2    port673 n_11_35_2    0.003
L_11_35_2    n_11_35_2    port680  9e-11
R_12_35 port674 n_12_35    0.003
L_12_35 n_12_35 port675    9e-11
R_13_35 port675 n_13_35    0.003
L_13_35 n_13_35 port676    9e-11
R_14_35 port676 n_14_35    0.003
L_14_35 n_14_35 port678    9e-11
R_6_36_2     port679 n_6_36_2     0.003
L_6_36_2     n_6_36_2     port694  9e-11
R_11_36_2    port680 n_11_36_2    0.003
L_11_36_2    n_11_36_2    port699  9e-11
R_16_36 port682 n_16_36    0.003
L_16_36 n_16_36 port683    9e-11
R_16_36_2    port682 n_16_36_2    0.003
L_16_36_2    n_16_36_2    port700  9e-11
R_17_36 port683 n_17_36    0.003
L_17_36 n_17_36 port684    9e-11
R_18_36 port684 n_18_36    0.003
L_18_36 n_18_36 port685    9e-11
R_19_36 port685 n_19_36    0.003
```

METHOD IMPLEMENTED ON COMPUTER SYSTEM EXECUTING INSTRUCTIONS FOR SEMICONDUCTOR DESIGN SIMULATION

CROSS-REFERENCE TO RELATED APPLICATIONS

This application claims priority under 35 U.S.C. § 119 to Korean Patent Application No. 10-2020-0023061, filed on Feb. 25, 2020, in the Korean Intellectual Property Office, the disclosure of which is incorporated by reference herein in its entirety.

BACKGROUND

Embodiments of the inventive concept described herein relate to a semiconductor design, and more particularly, relate to a method implemented with a computer system executing instructions for a semiconductor design simulation in which user convenience and power characteristics are improved.

The process of designing a semiconductor device includes deciding a floor plan indicating how circuit blocks are placed, deciding positions of bumps and balls, extracting a power model based on the bump and ball positions, and testing the power model to analyze whether the power model satisfies system requirements.

When a result of the analyzing indicates that the power model does not satisfy the system requirements, the bump and ball positions may again be decided, a power model may again be extracted, and the power model may again be tested.

In the process of designing the semiconductor device, the floor plan may be decided based on experience. For this reason, the floor plan of the semiconductor device may not be optimum, and characteristics of the semiconductor device based on the floor plane may not be optimum.

SUMMARY

Embodiments of the inventive concept provide a method implemented with a computer system executing instructions for a semiconductor design simulation that generates various floor plans, generates power models based on the floor plans, and selects one of the power models.

According to an exemplary embodiment, a method implemented with a computer system executing instructions for a semiconductor design simulation includes generating a plurality of floor plans, each of the plurality of floor plans including a plurality of circuit blocks placed differently, generating a plurality of power models from the plurality of floor plans, and selecting a layout corresponding to one of the plurality of floor plans by selecting at least one power model satisfying system requirements from among the plurality of power models.

According to an exemplary embodiment, a method implemented with a computer system executing instructions for a semiconductor design simulation includes generating a plurality of floor plans, each of the plurality of floor plans including a plurality of circuit blocks placed differently, generating a plurality of power bump and ball models from the plurality of floor plans, and generating a plurality of board power models from the plurality of power bump and ball models.

According to an exemplary embodiment, a method implemented with a computer system executing instructions for a semiconductor design simulation includes generating a plurality of floor plans, each of the plurality of floor plans including a plurality of circuit blocks placed differently, and generating a plurality of power bump models from the plurality of circuit blocks.

BRIEF DESCRIPTION OF THE FIGURES

The above and other objects and features of the inventive concept will become apparent by describing in detail exemplary embodiments thereof with reference to the accompanying drawings.

FIG. 17 illustrates an exemplary power bump and ball model generated by a step of generating a power bump and ball model of FIG. 3.

DETAILED DESCRIPTION

Below, embodiments of the inventive concept may be described in detail with reference to the drawings. Like numbers refer to like elements throughout.

Figure 1:
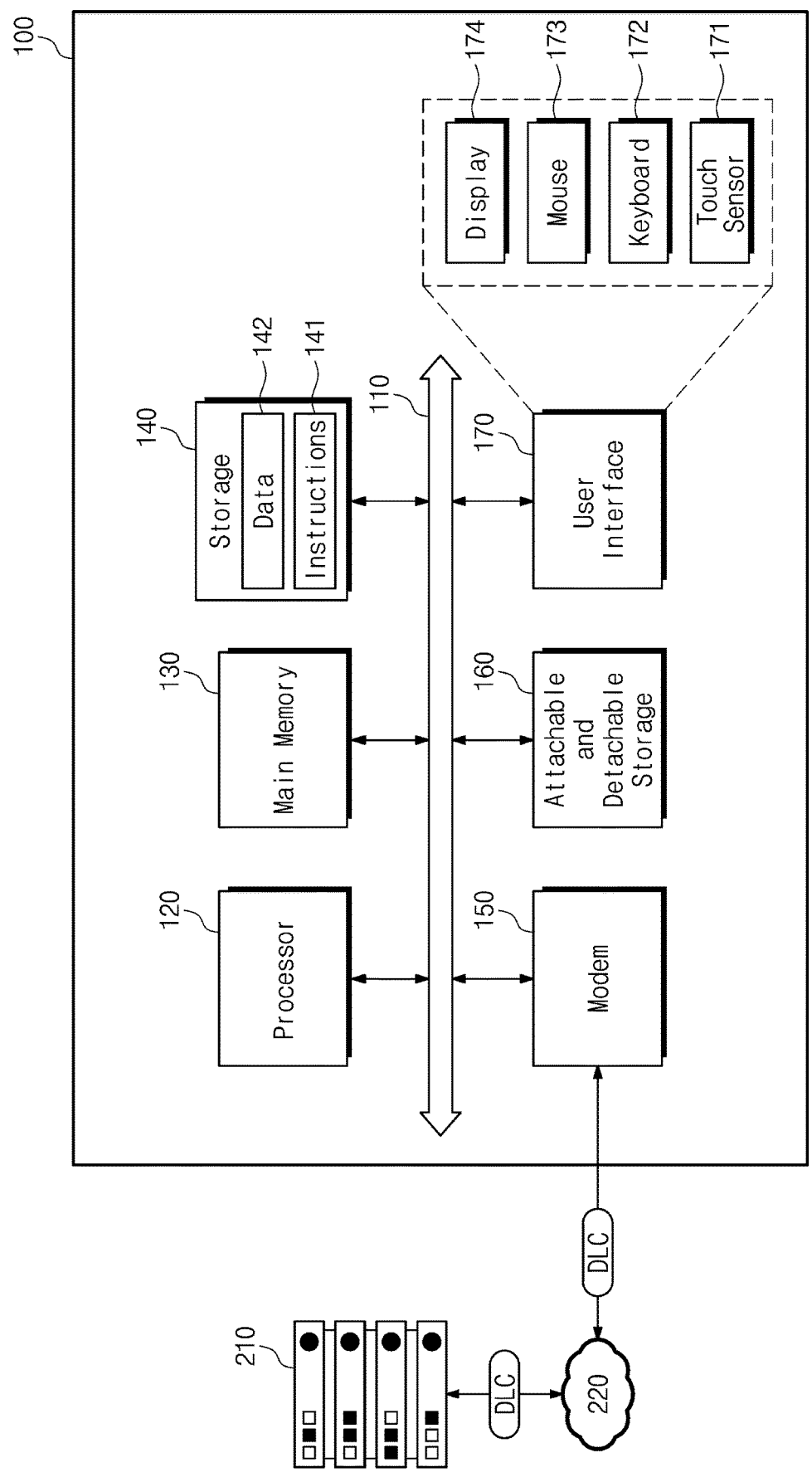
FIG. 1 illustrates a semiconductor design system, according to an example embodiment of the inventive concept.

FIG. 1 illustrates a semiconductor design system 100, according to an embodiment of the inventive concept. Referring to FIG. 1, the semiconductor design system 100 includes a bus 110, a processor 120, a main memory 130, storage 140, a modem 150, attachable and detachable storage 160, and a user interface 170.

The bus 110 provides a channel between components of the semiconductor design system 100, allowing the components to transmit/receive data and instructions to/from one another. The processor 120 may control the semiconductor design system 100 and may perform a simulation for a semiconductor design. For example, the processor 120 may execute a tool (see, e.g., tool 300 of FIG. 5) for the simulation by executing instructions 141 stored in the storage 140.

At least a part of the instructions 141 may include an algorithm that is learned based on machine learning for the semiconductor design. The semiconductor design system 100 may perform at least a part of steps for the semiconductor design simulation by executing at least some instructions corresponding to the algorithm.

The processor 120 may execute the simulation for semiconductor design with reference to data 142 stored in the storage 140. The data 142 may include libraries including a variety of information necessary for the semiconductor design, pieces of information for the semiconductor design, which the user inputs through the user interface 170, etc.

The main memory 130 may be a working memory of the processor 120. The main memory 130 may temporarily store instructions and/or data, which the processor 120 requires, from among the instructions 141 and/or the data 142 stored in the storage 140. The main memory 130 may include a high-speed random access memory, such as, for example, a DRAM, a PRAM, an MRAM, or an RRAM, or a storage class memory (SCM).

The storage 140 may be used as a secondary memory of the semiconductor design system 100. The storage 140 may store the instructions 141 constituting the tool of the semiconductor design simulation, and the data 142 for a semiconductor model targeted for the simulation. The storage 140 may include, for example, a hard disk drive (HDD), a solid state drive (SSD), an optical disk drive (ODD), etc.

The modem 150 may communicate wired or wirelessly with an external device 210 over a network 220. For example, the instructions 141 and/or the data 142 may be stored in the storage 140 as content DLC (downloadable content) downloaded from the external device 210 through the modem 150. The instructions 141 and/or the data 142 stored in the storage 140 may be transferred to the external device 210 through the modem 150. The modem 150 may operate based on the Ethernet protocol and technologies.

The attachable and detachable storage 160 may include portable storage. For example, the instructions 141 and/or the data 142 may be moved from the attachable and detachable storage 160 to the storage 140. The instructions 141 and/or the data 142 stored in the storage 140 may be moved to the attachable and detachable storage 160. The attachable and detachable storage 160 may be based on one of various standards such as a universal serial bus (USB) and serial advanced technology attachment (SATA).

The user interface 170 may include various user input interface devices such as, for example, a touch sensor 171, a keyboard 172, and a mouse 173. The user interface 170 may receive an execution instruction of the tool for simulation, various instructions for simulation functions of the tool, and a variety of information necessary to perform a simulation of the tool.

The user interface 170 may include various user output interface devices such as, for example, a display device 174. The user interface 170 may display on the display device 174 a semiconductor model to be simulated and a process and a result of the simulation for the semiconductor model.

In an example embodiment, the semiconductor design system 100 may be implemented with a general-use computer or a special-purpose computer for the semiconductor simulation. The semiconductor simulation tool (see, e.g., tool 300 of FIG. 5) may be transferred through the modem 150 in the form of the instructions 141 or may be installed on the semiconductor design system 100 through the attachable and detachable storage 160. The data 142 may be transferred through the modem 150, may be transferred through the attachable and detachable storage 160, or may be input through the user interface 170.

Below, various methods that may be performed by the semiconductor design system 100 will be described for respective steps. At least one of the steps may be omitted. The at least one step thus omitted may be performed by any other external device or may be performed by the user. In an example embodiment, at least one of the steps of the various methods that may be performed by the semiconductor design system 100 may be performed using an algorithm learned by the machine learning.

Below, the terms "bump" and "ball" are used. The "bump" may be manufactured when semiconductor dies are formed on a wafer and may be used to mount a semiconductor die in a board (or substrate) of a semiconductor package. The "ball" may be manufactured in the process of manufacturing a semiconductor package and may be used to mount the semiconductor package in any other external device. A size of the "ball" may be larger than a size of the "bump".

Below, the term "library" is used. The "library" may be sets of information that may be used to simulate a design of a semiconductor device. The "library" may be included in the data 142 or may be transferred from the external device 210 to the semiconductor design system 100 through the network 220 and the modem 150.

Below, unless explicitly mentioned, information that may be used (or referred to) by the semiconductor design system 100 may be input from the user through the user interface 170, may be transferred through the attachable and detachable storage 160, and/or may be transferred from the external device 210 through the network 220 and the modem 150.

Figure 2:
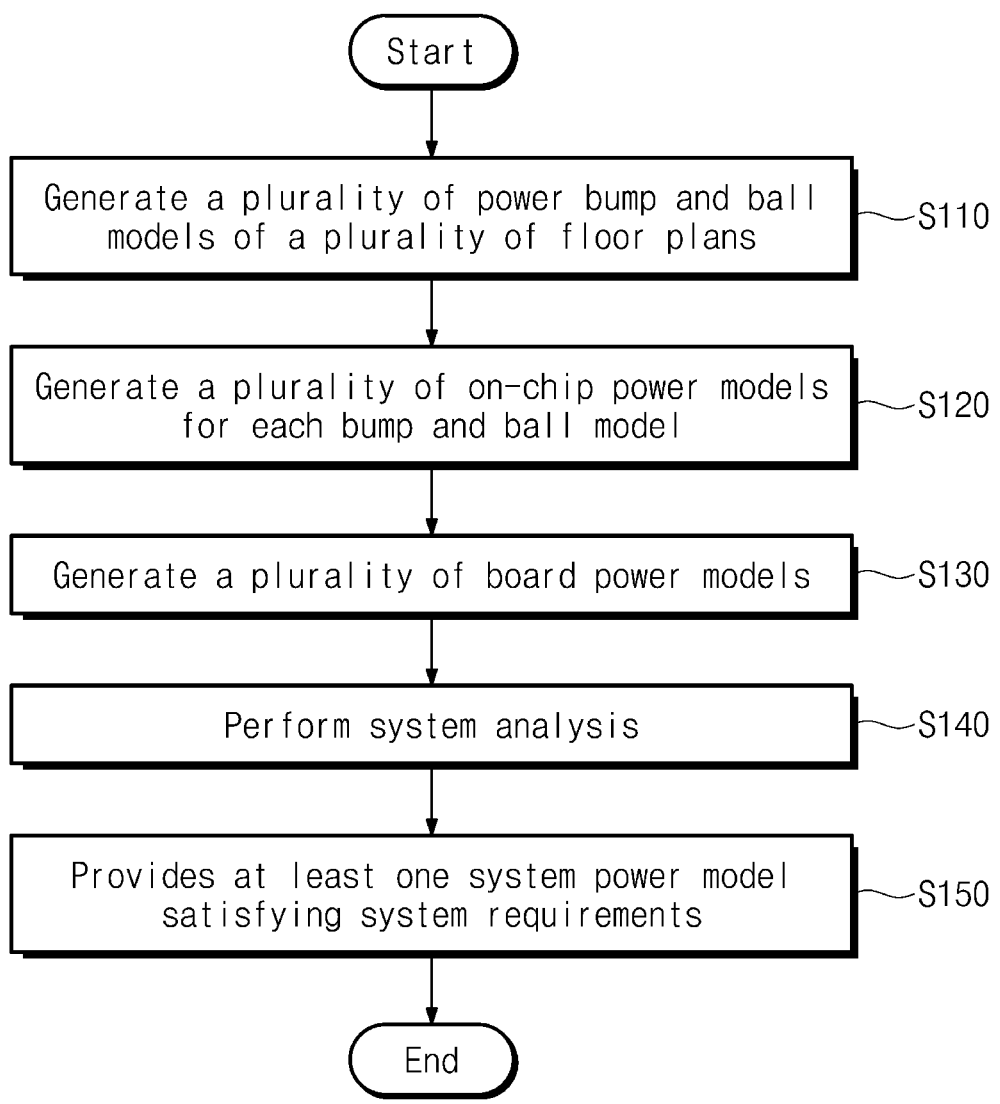
FIG. 2 illustrates an example method for a semiconductor design system of FIG. 1, which is implemented with a computer system.

FIG. 2 illustrates a method for the semiconductor design system 100 of FIG. 1, which is implemented with a computer system. Referring to FIGS. 1 and 2, in step S110, the semiconductor design system 100 may generate a plurality of power bump and ball models of a plurality of floor plans. The power bump and ball models may be, for example, layouts corresponding to the power bumps and balls of a semiconductor package under test.

In step S120, the semiconductor design system 100 may generate a plurality of on-chip power models for each power bump and ball model. In step S130, the semiconductor design system 100 may generate a plurality of board power models.

In step S140, the semiconductor design system 100 may generate system power models from the plurality of power bump and ball models, the plurality of on-chip power models, and the plurality of board power models, and may perform system power analyses on the system power models.

In step S150, the semiconductor design system 100 may provide (e.g., display) at least one power model satisfying system requirements. For example, the semiconductor design system 100 may display at least one power model on the display device 174.

According to an example embodiment of the inventive concept, the generation of floor plans, the generation of power bump and ball models, the generation of on-chip power models, the generation of board power models, the generation of system power models, and the system power analyses may be performed through one tool. Accordingly, user convenience may be improved.

Also, according to an example embodiment of the inventive concept, system power models are generated from various floor plans, and system power analyses are performed for each of the various floor plans. Because various floor plans are considered, at least one system power model provided in step S150 may have power characteristics that are further improved.

Figure 3:
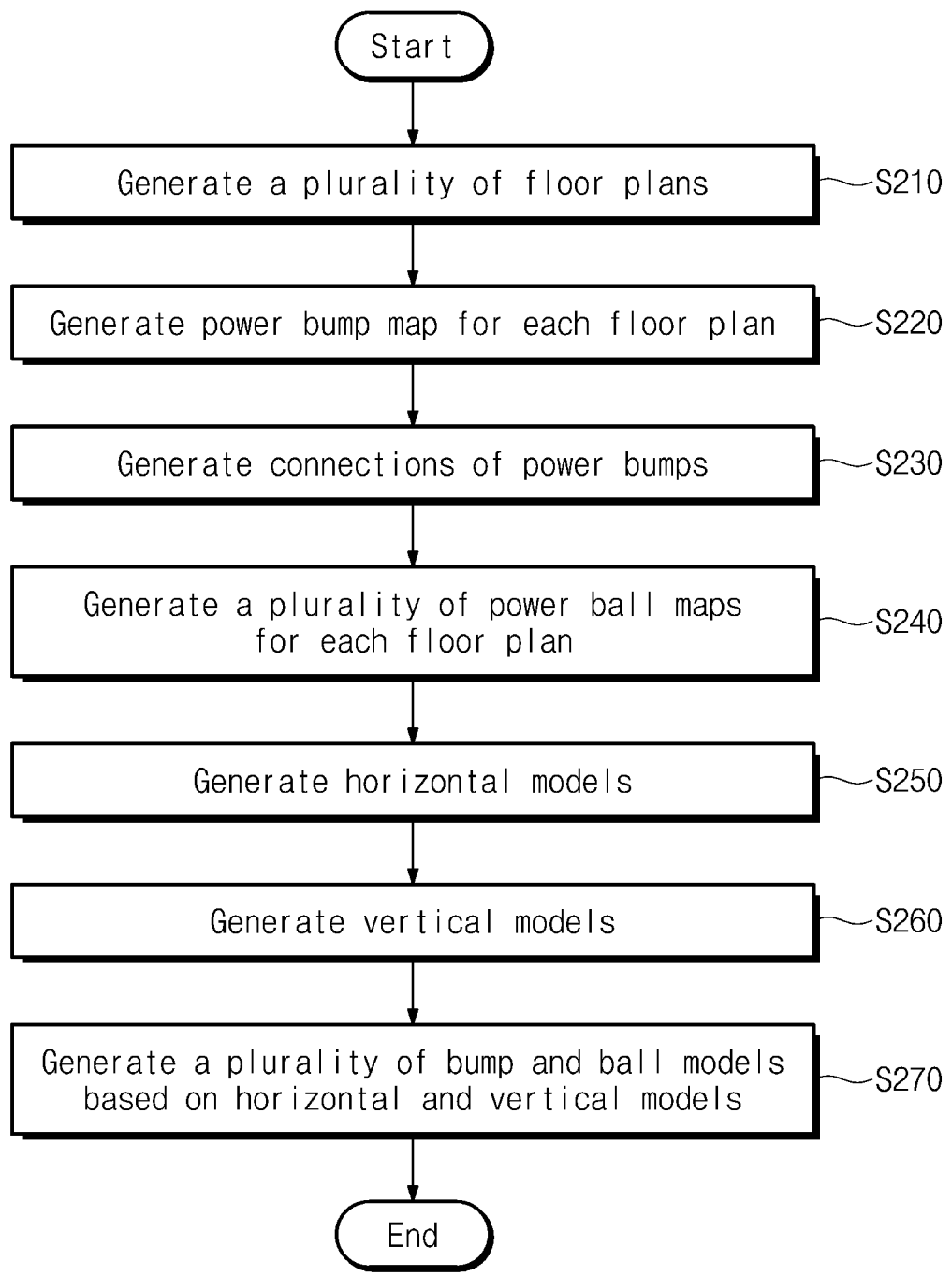
FIG. 3 illustrates an example of a step of generating a plurality of power bump and ball models.

FIG. 3 illustrates an example of a step (step S110 of FIG. 2) of generating a plurality of power bump and ball models. Referring to FIGS. 1 and 3, in step S210, the semiconductor design system 100 may generate a plurality of floor plans. The plurality of floor plans may be configured to place circuit blocks in different positions or locations. The circuit blocks may include given designs for performing given functions. The circuit blocks may be called an "intellectual property (IP)". As used herein, intellectual property (IP) may also be referred to as intellectual property cores, and may be used to denote self-contained discrete units that provide macro functions to the system. Those skilled in the art will appreciate that the disclosed intellectual property or intellectual property cores are physically implemented by electronic (or optical) circuits, such as logic circuits, discrete components, microprocessors, hard-wired circuits, memory elements, wiring connections, buses, communication links, and the like, which may be formed using semiconductor-based fabrication techniques or other manufacturing technologies.

In step S220, the semiconductor design system 100 may generate a power bump map for each floor plan. For example, in step S220, a plurality of power bump maps respectively corresponding to the plurality of floor plans may be generated. The plurality of power bump maps may be generated on the plurality of floor plans and may be regarded as including the plurality of floor plans, respectively.

In step S230, the semiconductor design system 100 may generate power connection maps of power bumps of the power bump maps. For example, in step S230, the plurality of power connection maps respectively corresponding to the plurality of floor plans may be generated. The plurality of power connection maps may be generated on the plurality of power bump maps and may be regarded as including the plurality of power bump maps (or the plurality of floor plans), respectively.

In step S240, the semiconductor design system 100 may generate a plurality of power ball maps for each floor plan. For example, in step S240, power ball maps, the number of which is more than the number of the plurality of power connection maps, may be generated from the plurality of power connection maps. The plurality of power ball maps may be generated by varying the number of power balls and positions of the power balls at each power connection map.

The plurality of power ball maps may be generated on the plurality of power connection maps, and each of the plurality of power ball maps may be regarded as including the corresponding floor plan, the corresponding power bump map, and the corresponding power connection maps.

In step S250, the semiconductor design system 100 may generate a plurality of horizontal power models. Each of the horizontal power models may include models of resistance and inductance (or capacitance) components of horizontal connections connecting power bumps and power balls, at the corresponding power ball map of the plurality of power ball maps.

In step S260, the semiconductor design system 100 may generate a plurality of vertical power models. Each of the vertical power models may include models of resistance and inductance (or capacitance) components of vertical connections connecting power bumps and power balls, at the corresponding power ball map of the plurality of power ball maps.

In step S270, the semiconductor design system 100 may generate a plurality of bump and ball models based on the plurality of power ball maps, the plurality of horizontal power models, and the plurality of vertical power models. Each of the plurality of bump and ball models may be based on the corresponding floor plan of the plurality of floor plans.

Each of the plurality of bump and ball models may be based on the corresponding horizontal power model of the plurality of horizontal power models and the corresponding vertical power model of the plurality of vertical power models. For example, each of the plurality of bump and ball models may include power models (e.g., expressed by resistance, inductance, or capacitance components) between power bumps and power balls when the corresponding floor plan of the plurality of floor plans is selected.

Figure 4:
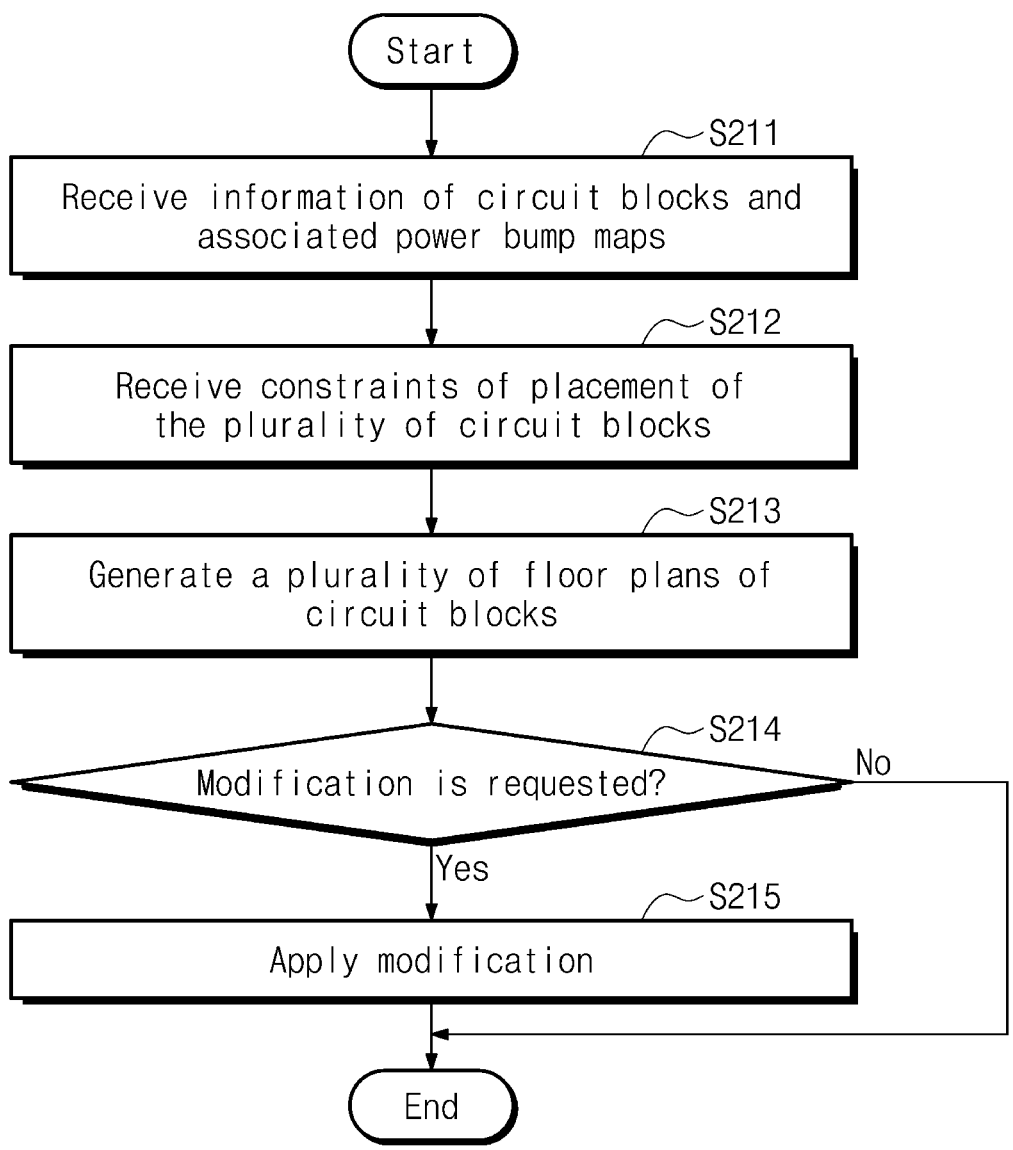
FIG. 4 illustrates an example of a step of generating a plurality of floor plans.
Figure 5:
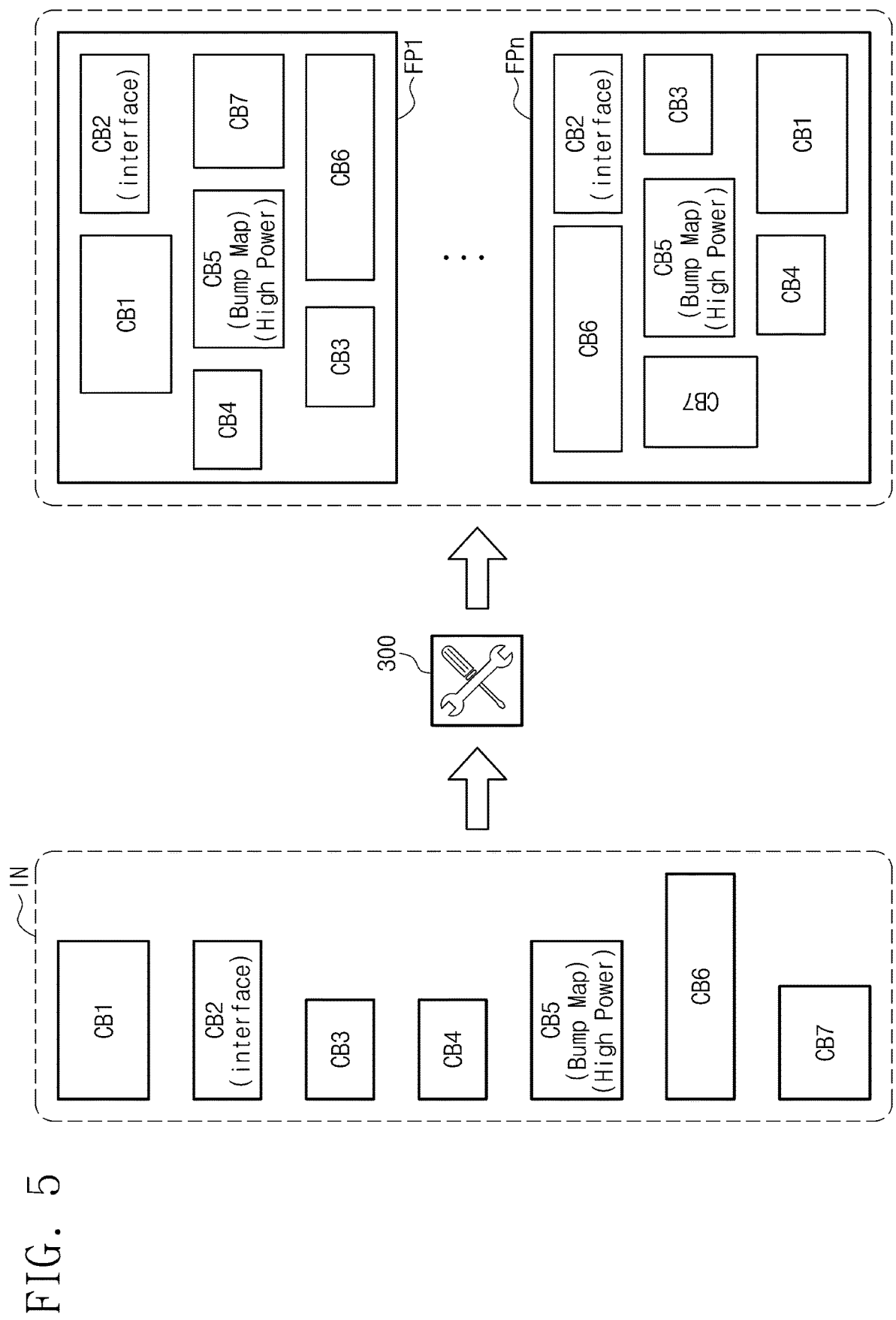
FIG. 5 illustrates an example in which a plurality of floor plans are generated based on the method of FIG. 4.

FIG. 4 illustrates an example of a step (step S210 of FIG. 3) of generating a plurality of floor plans. FIG. 5 illustrates an example in which a plurality of floor plans are generated based on the method of FIG. 4. Referring to FIGS. 1, 4, and 5, in step S211, the semiconductor design system 100 may receive information IN of circuit blocks and associated power bump maps.

For example, the information IN may be input to the semiconductor design system 100 through the user interface 170 by the user. Alternatively, the information IN may be transferred from the external device 210 to the semiconductor design system 100 through the modem 150 or may be transferred to the semiconductor design system 100 by the attachable and detachable storage 160.

In an example embodiment, first to seventh circuit blocks CB1 to CB7 may be input as the information IN for the purpose of simulating a semiconductor design. For example, the fifth circuit block CB5 of the first to seventh circuit blocks CB1 to CB7 may have an associated bump map, and the remaining circuit blocks may not have associated bump maps. The information IN may further include a variety of information about the first to seventh circuit blocks CB1 to CB7, such as power consumption information and function information.

In an embodiment, the information IN may include identification information about the first to seventh circuit blocks CB1 to CB7. The semiconductor design system 100 may obtain pieces of associated information from a library including a variety of information of circuit blocks, such as power information and function information.

In step S212, the semiconductor design system 100 may receive constraints of the placement of the plurality of circuit blocks in the plurality of floor plans. The constraints may be input to the semiconductor design system 100 through the user interface 170. Alternatively, the constraints may be transferred from the external device 210 to the semiconductor design system 100 through the modem 150 or may be transferred to the semiconductor design system 100 by the attachable and detachable storage 160.

In an example embodiment, the constraints may include a placement order according to areas of the plurality of floor plans. The constraints may define the placement of the first to seventh circuit blocks CB1 to CB7 in order from largest to smallest in the plurality of floor plans. Alternatively, the constraints may define the placement of the first to seventh circuit blocks CB1 to CB7 such that circuit blocks having sizes larger than a threshold from among the first to seventh circuit blocks CB1 to CB7 are placed prior to circuit blocks having sizes equal to or smaller than the threshold in the plurality of floor plans.

The constraints may define the placement of an interface configured to communicate with the external device 210 at an outer portion. For example, the second circuit block CB2 may be an interface configured to be connected with the external device 210. Alternatively, the constraints may define the placement of a circuit block of a serializer and a deserializer at an outer portion of the plurality of floor plans.

The constraints may define the placement of a circuit block consuming a high power from among the first to seventh circuit blocks CB1 to CB7 at the center of the plurality of floor plans. The constraints may define the placement of specific circuit blocks defined by the constraints so as to be spaced from each other as much as a distance shorter than a specific distance defined by the constraints. For example, the constraints may define the placement of specific circuit blocks to be spaced apart by a distance less than a maximum specific distance.

In step S213, the semiconductor design system 100 may generate a plurality of floor plans of circuit blocks. The semiconductor design system 100 may display the plurality of floor plans thus generated through the user interface 170. For example, the semiconductor design system 100 may display the plurality of floor plans on a display device 174.

The constraints may further define a display priority. For example, the constraints may allocate priorities to the plurality of floor plans. In detail, the constraints may define the allocation of priorities such that a priority becomes higher as a total size of each of the plurality of floor plans decreases. Also, the constraints may define to display the plurality of floor plans through the display device 174 of the user interface 170 based on the allocated priorities.

For example, the semiconductor design system 100 may display on the display device 174 a floor plan having a higher priority from among the plurality of floor plans before a floor plan having a lower priority, or may display the higher priority floor plan on the left or on the top of the screen of the display device 174. The semiconductor design system 100 may display a floor plan having a lower priority from among the plurality of floor plans before a floor plan having a higher priority, or may display the lower priority floor plan on the right or on the bottom of the screen of the display device 174.

The constraints may define the way to discard floor plans. The constraints may define to discard floor plans, each of which has a total size larger than a threshold, and to generate and display floor plans, each of which has a total size equal to or smaller than the threshold, as a plurality of floor plans.

In FIG. 5, first to n-th floor plans FP1 to FPn (n being a positive integer) may be generated from the information IN by a tool 300. In the example of FIG. 5, the fifth circuit block CB5 consuming a high power may be placed at the center based on the constraints, and the second circuit block CB2 performing a function of an interface may be placed at an outer portion of the first to n-th floor plans FP1 to FPn.

In step S214, the semiconductor design system 100 may determine whether modification is requested. For example, when modification of at least one floor plan is input by the user through the user interface 170, it may be determined that the modification is requested (step S214, Yes). The modification may include modification associated with a position or orientation of at least one of the first to seventh circuit blocks CB1 to CB7, or modification associated with at least one of the constraints (e.g., addition, deletion, or change of at least one of the constraints).

In step S215, the semiconductor design system 100 may apply the modification requested by the user to at least one floor plan.

Figure 6:
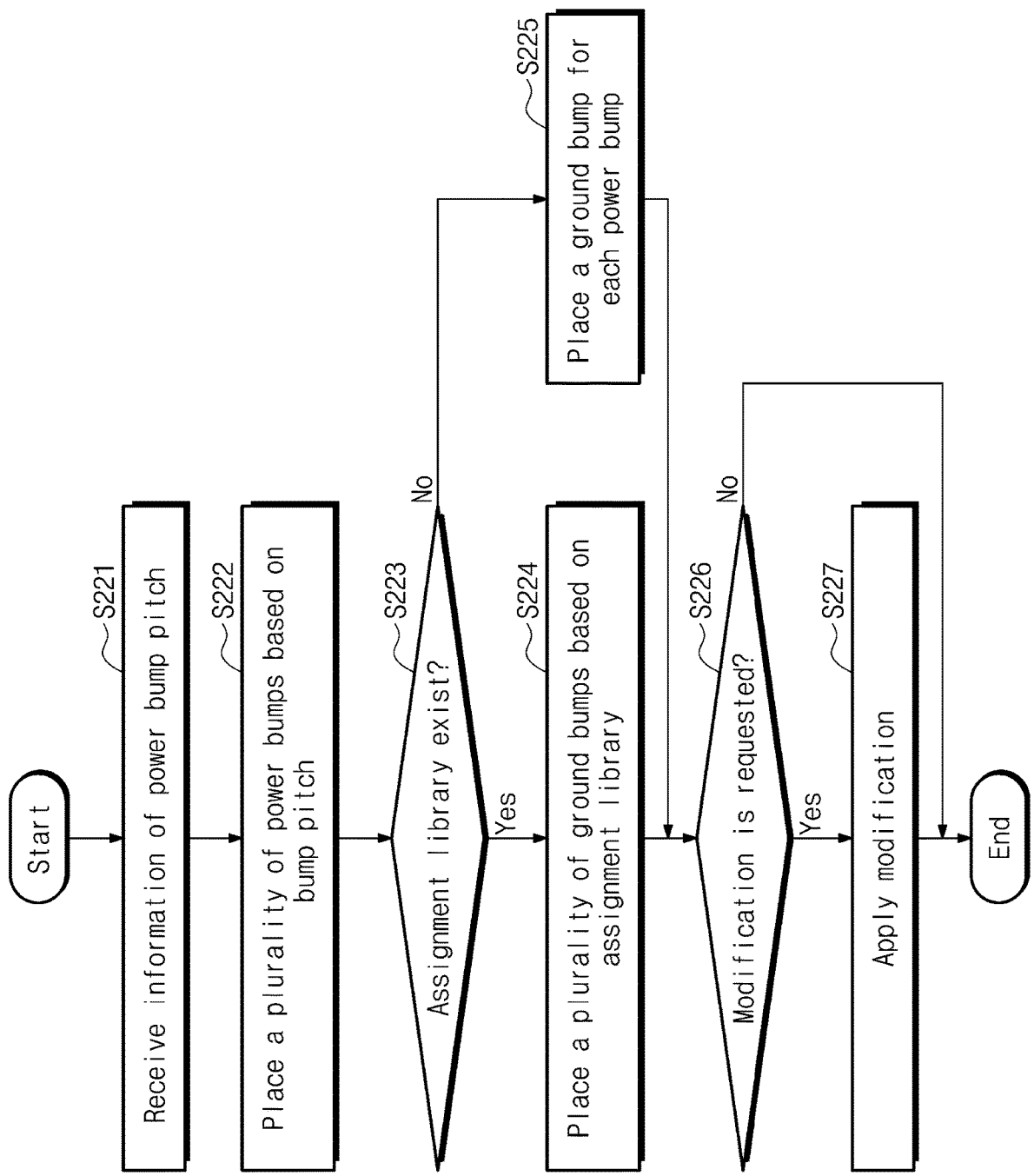
FIG. 6 illustrates an example of a step of generating a plurality of power bump maps.
Figure 7:
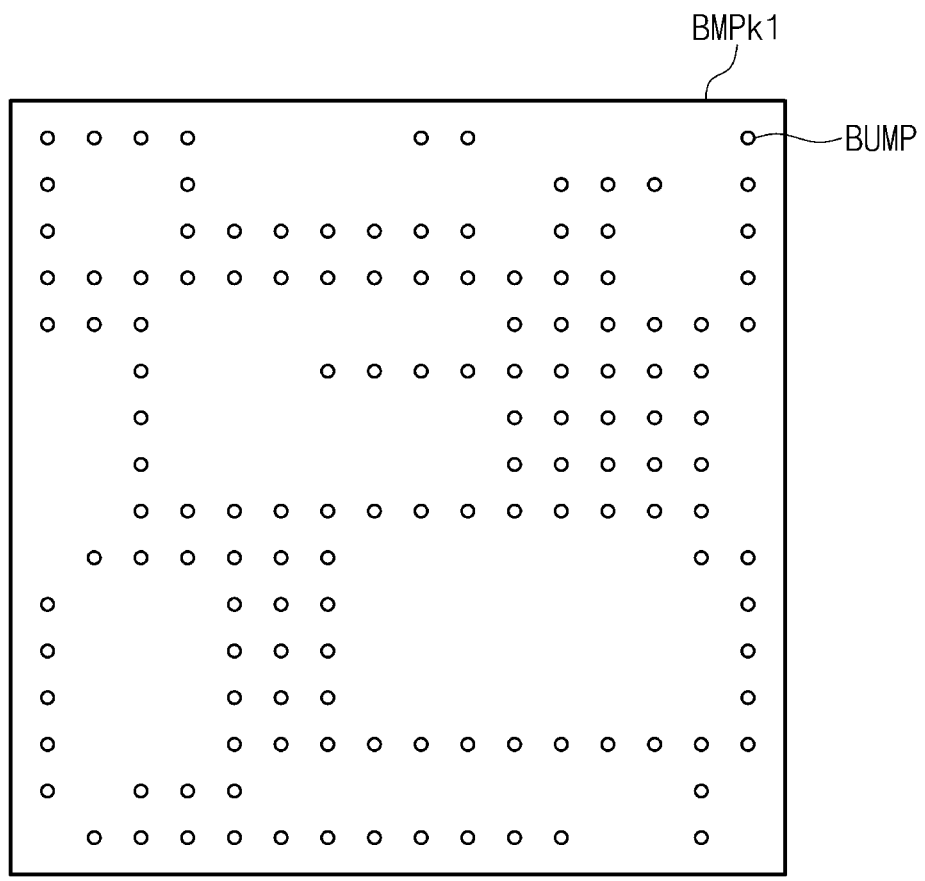
FIG. 7 illustrates an example in which an exemplary power bump map is generated based on a method of FIG. 6.

FIG. 6 illustrates an example of a step (step S220 of FIG. 3) of generating a plurality of power bump maps. FIG. 7 illustrates an example in which an exemplary power bump map BMPk1 is generated based on the method of FIG. 6.

Referring to FIGS. 1, 6, and 7, in step S221, the semiconductor design system 100 may receive information of a power bump pitch through one of various methods described in association with the information IN.

In step S222, the semiconductor design system 100 may place a plurality of power bumps BUMP based on the power bump pitch. For example, the semiconductor design system 100 may place the power bumps BUMP in a space other than spaces designated for signals other than a power and in a space other than a space of a circuit block having a bump map like the fifth circuit block CB5.

Information about a space where the placement of power bumps is prohibited may be received as a portion of the information IN. Alternatively, information about a space where the placement of power bumps is prohibited may be obtained from a library based on the information IN.

In step S223, the semiconductor design system 100 may determine whether an assignment library exists. When the assignment library exists (step S223, Yes), in step S224, the semiconductor design system 100 may place a plurality of ground bumps based on the assignment library. When the assignment library does not exist (step S223, No), in step S225, the semiconductor design system 100 may place at least one ground bump at each power bump "BUMP". The semiconductor design system 100 may display the power bump maps through the user interface 170. For example, the semiconductor design system 100 may display the power bump maps on the display device 174.

In step S226, the semiconductor design system 100 may determine whether modification is requested. For example, when modification of at least one power bump map is input by the user through the user interface 170, it may be determined that the modification is requested (step S226, Yes).

In step S227, the semiconductor design system 100 may apply the modification requested by the user to at least one power bump map. When a modification to the at least one power bump map is applied, the semiconductor design system 100 may display the at least one modified power bump map on the display device 174.

Figure 8:
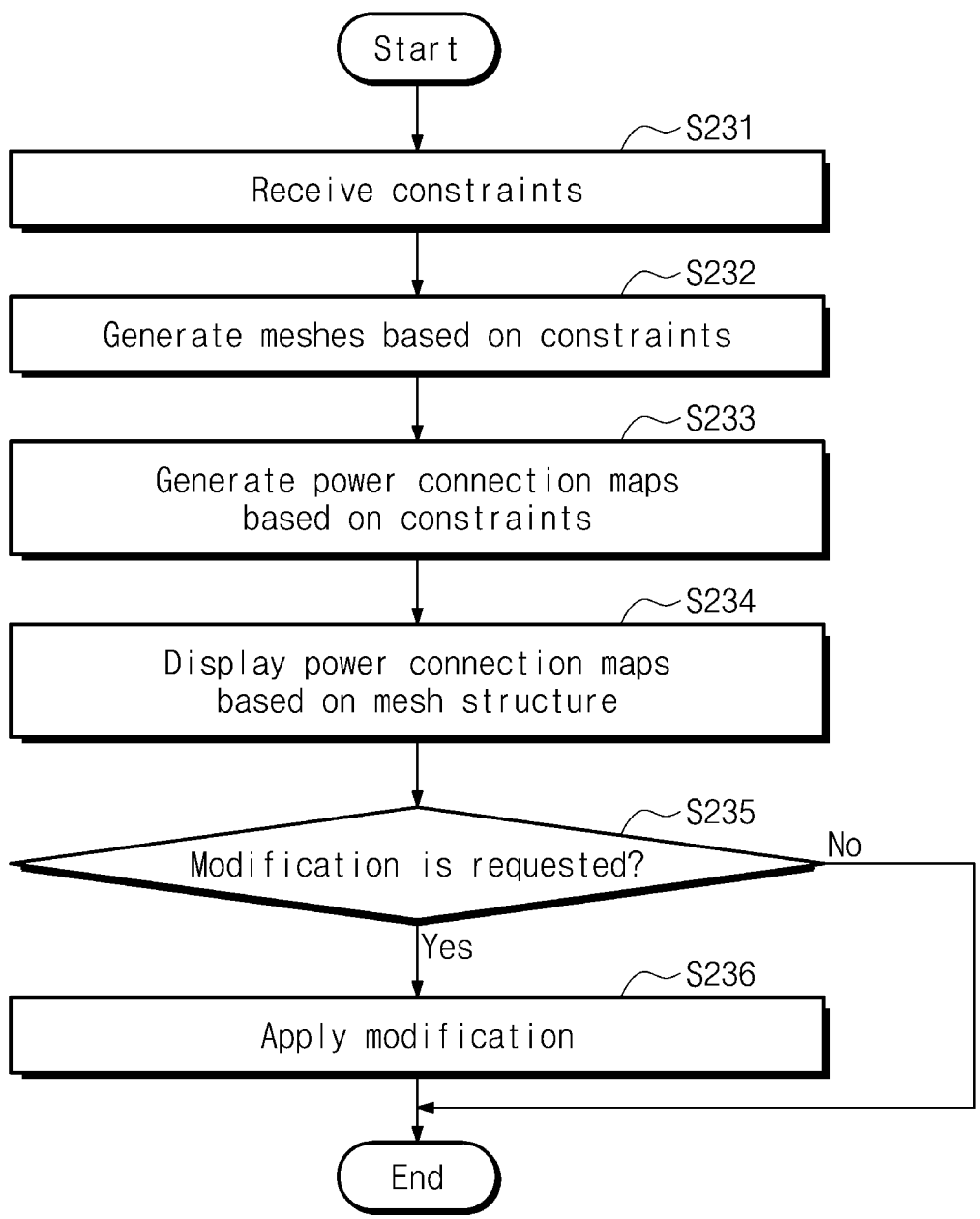
FIG. 8 illustrates an example of a step of generating a plurality of power connection maps of FIG. 3.
Figure 9:
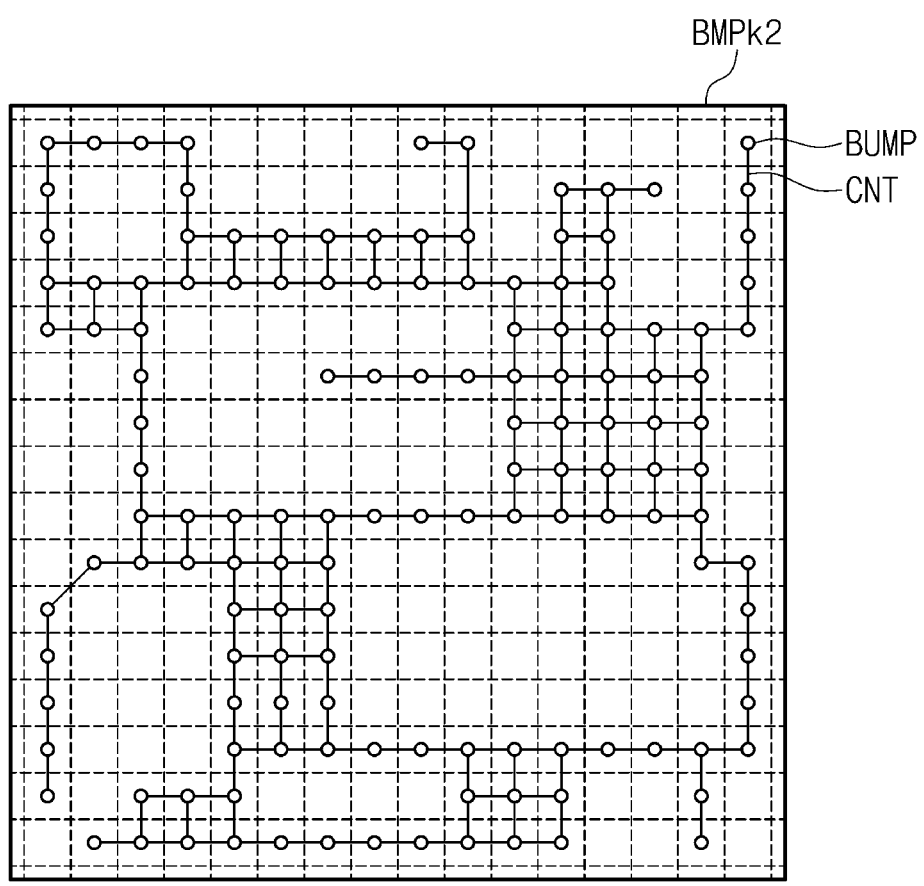
FIG. 9 illustrates an example in which an exemplary horizontal power model is generated based on a method of FIG. 8.

FIG. 8 illustrates an example of a step (step S230 of FIG. 3) of generating a plurality of power connection maps of FIG. 3. FIG. 9 illustrates an example in which a connection map BMPk2 corresponding to one bump map BMPk1 is generated based on the method of FIG. 8.

Referring to FIGS. 1, 8, and 9, in step S231, the semiconductor design system 100 may receive constraints for power connection maps. The constraints may be received through one of various methods mentioned with reference to the information IN. The constraints may include information about a size of a mesh and a unit distance.

In step S232, the semiconductor design system 100 may generate meshes based on the constraints. The semiconductor design system 100 may connect all power bumps having an interval equal to or smaller than the unit distance defined by the constraints. Also, as defined by the constraints, the semiconductor design system 100 may connect an isolated power bump, from which an adjacent power bump does not exist within an interval of the unit distance or less, with the closest power bump.

In an example embodiment, as illustrated in FIG. 9, a size of a mesh may be set to be equal to a bump pitch, but the mesh size is not limited thereto. Also, the unit distance may be set to one mesh, but the unit distance is not limited thereto. Herein, the term "mesh" may refer to the individual units that form a mesh structure, and the size of a mesh may refer to the distance between parallel sides of an individual unit. In FIG. 9, the mesh structure is illustrated by dashed lines.

In step S233, the semiconductor design system 100 may add connections CNT based on the constraints to generate power connection maps. The connections CNT may connect each power bump BUMP to one or more other power bumps BUMP. In step S234, the semiconductor design system 100 may display the power connection maps based on a mesh structure. For example, as illustrated in FIG. 9, the semiconductor design system 100 may display connections CNT on meshes through the user interface 170. For example, the semiconductor design system 100 may display the display connections CNT on the display device 174.

Figure 10:
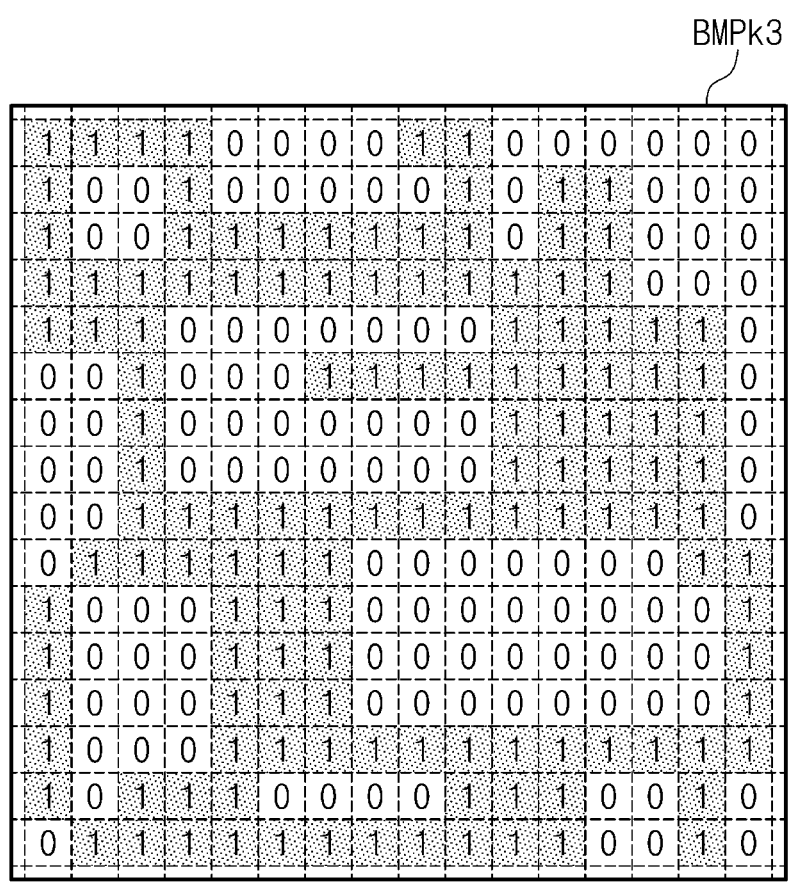
FIG. 10 illustrates an example of a power connection map in which a mesh where a connection exists and a mesh where a connection does not exist are marked by different colors.

For another example, as illustrated in FIG. 10, the semiconductor design system 100 may display meshes, in which the connections CNT exist, from among meshes by "1" and may display meshes, in which the connections CNT do not exist, by "0". The semiconductor design system 100 may display a power connection map BMPk3, in which "1" and "0" are marked by different colors, on meshes.

In step S235, the semiconductor design system 100 may determine whether modification is requested. For example, when modification of at least one power connection map is input by the user through the user interface 170, it may be determined that the modification is requested (step S235, Yes).

In step S236, the semiconductor design system 100 may apply the modification requested by the user to at least one power connection map. When a modification to the at least one power connection map is applied, the semiconductor design system 100 may display the at least one modified power connection map on the display device 174.

Figure 11:
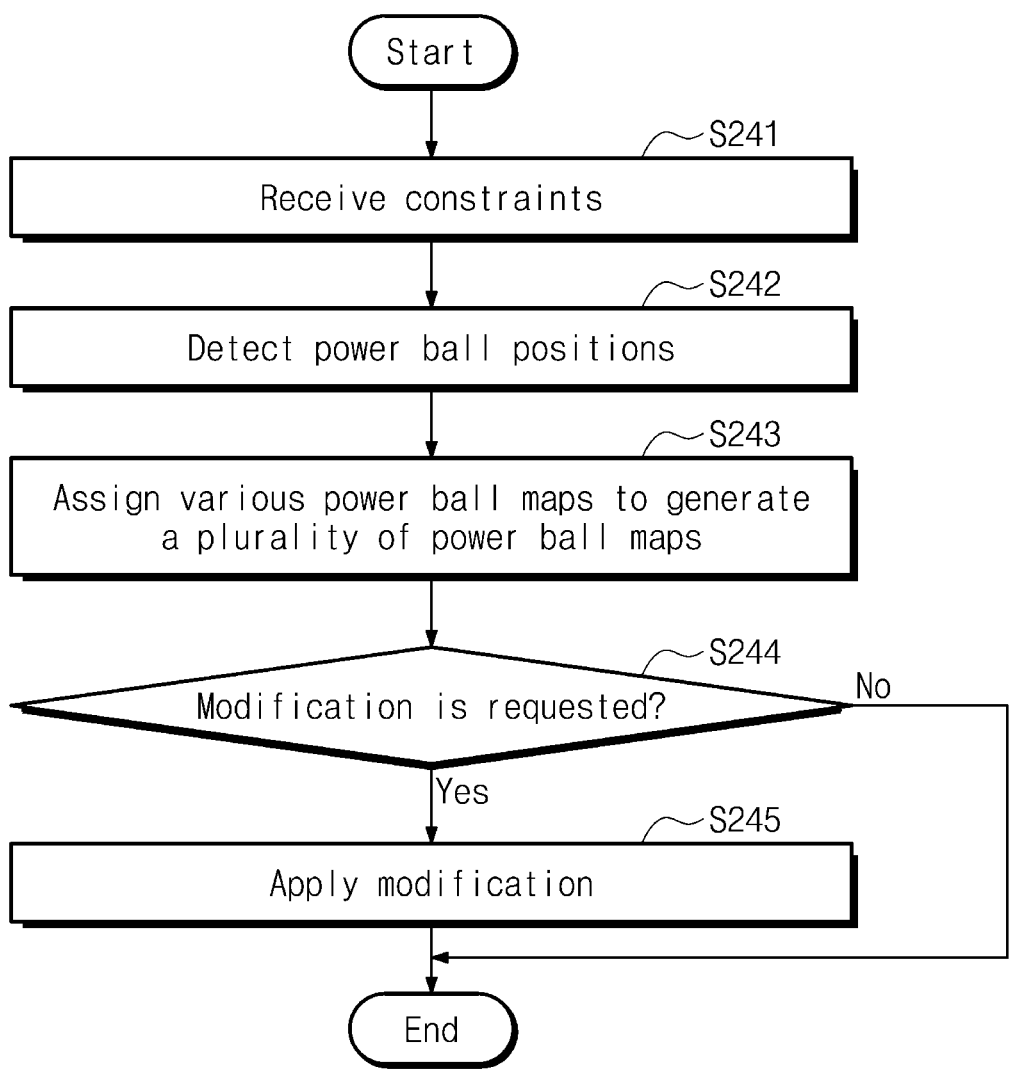
FIG. 11 illustrates an example of a step of generating a plurality of power ball maps of FIG. 3.
Figure 12:
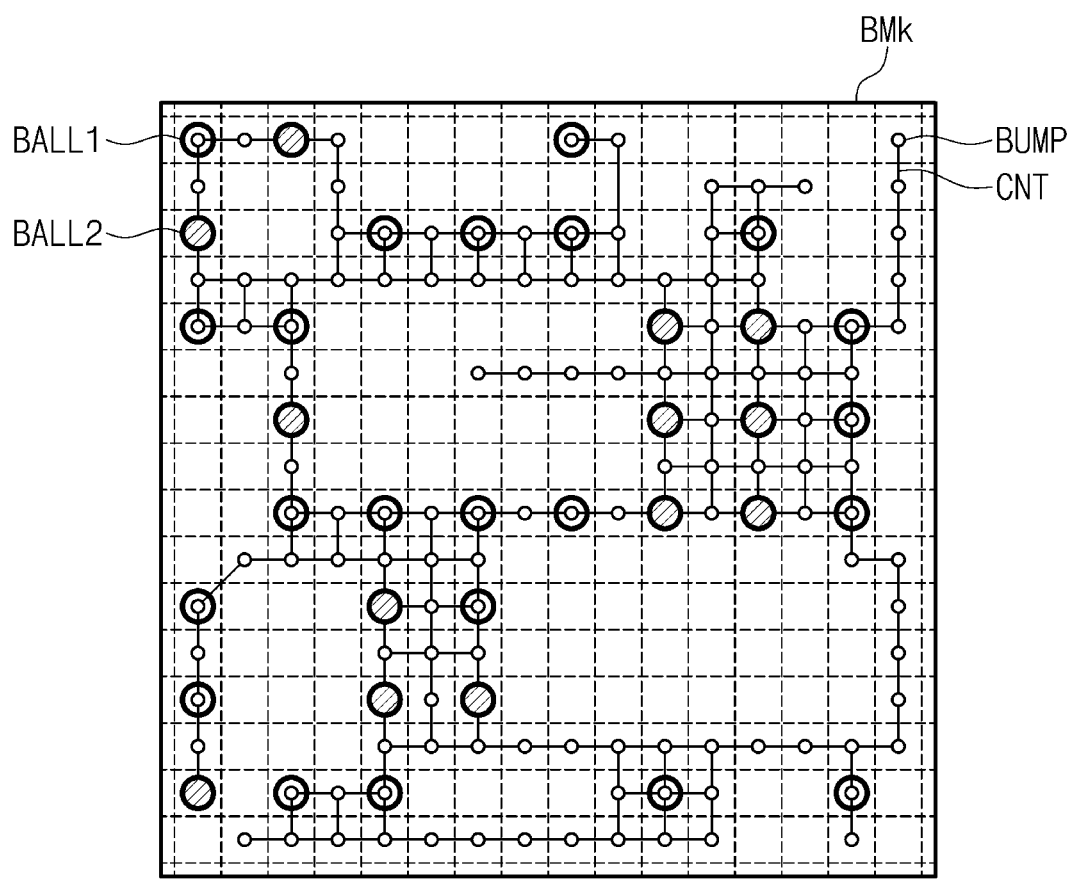
FIG. 12 illustrates an example in which an exemplary power bump map is generated based on a method of FIG. 11.

FIG. 11 illustrates an example of a step (step S240 of FIG. 3) of generating a plurality of power ball maps of FIG. 3. FIG. 12 illustrates an example in which an exemplary power bump map BMk is generated based on the method of FIG. 11.

Referring to FIGS. 1, 11, and 12, in step S241, the semiconductor design system 100 may receive constraints through one of various methods described in association with the information IN. The constraints may include a variety of information such as a power ball pitch, a minimum value and a maximum value of power balls (e.g., minimum number of power balls and maximum number of power balls), and information about an area where power balls are incapable of being placed.

In step S242, the semiconductor design system 100 may detect positions where a plurality of power balls are capable of being placed, based on the power ball pitch. In FIG. 12, the power ball pitch corresponds to two meshes, and positions where power balls are capable of being placed are marked in the form of a thick circle like first balls BALL1.

In step S243, the semiconductor design system 100 may assign various power ball maps to generate a plurality of power ball maps. For example, the semiconductor design system 100 may generate a plurality of power ball maps from one power connection map by changing the number of power balls (within a range from the maximum value to the minimum value) or changing positions of power balls.

Various power characteristics may be included in power ball maps by varying the number of power balls and positions of the power balls. In FIG. 12, balls, at which power balls are actually placed, from among the first balls BALL1 are marked by second balls BALL2 that are filled with oblique lines.

In step S244, the semiconductor design system 100 may determine whether modification is requested. For example, when modification of at least one power ball map is input by the user through the user interface 170, it may be determined that the modification is requested (step S244, Yes).

In step S245, the semiconductor design system 100 may apply the modification requested by the user to at least one power ball map.

In an example embodiment, sizes of meshes may be determined based on a bump pitch of power balls and a ball pitch of power balls. Sizes of meshes may correspond to the greatest common factor of a bump pitch of power balls and a ball pitch of power balls.

Figure 13:
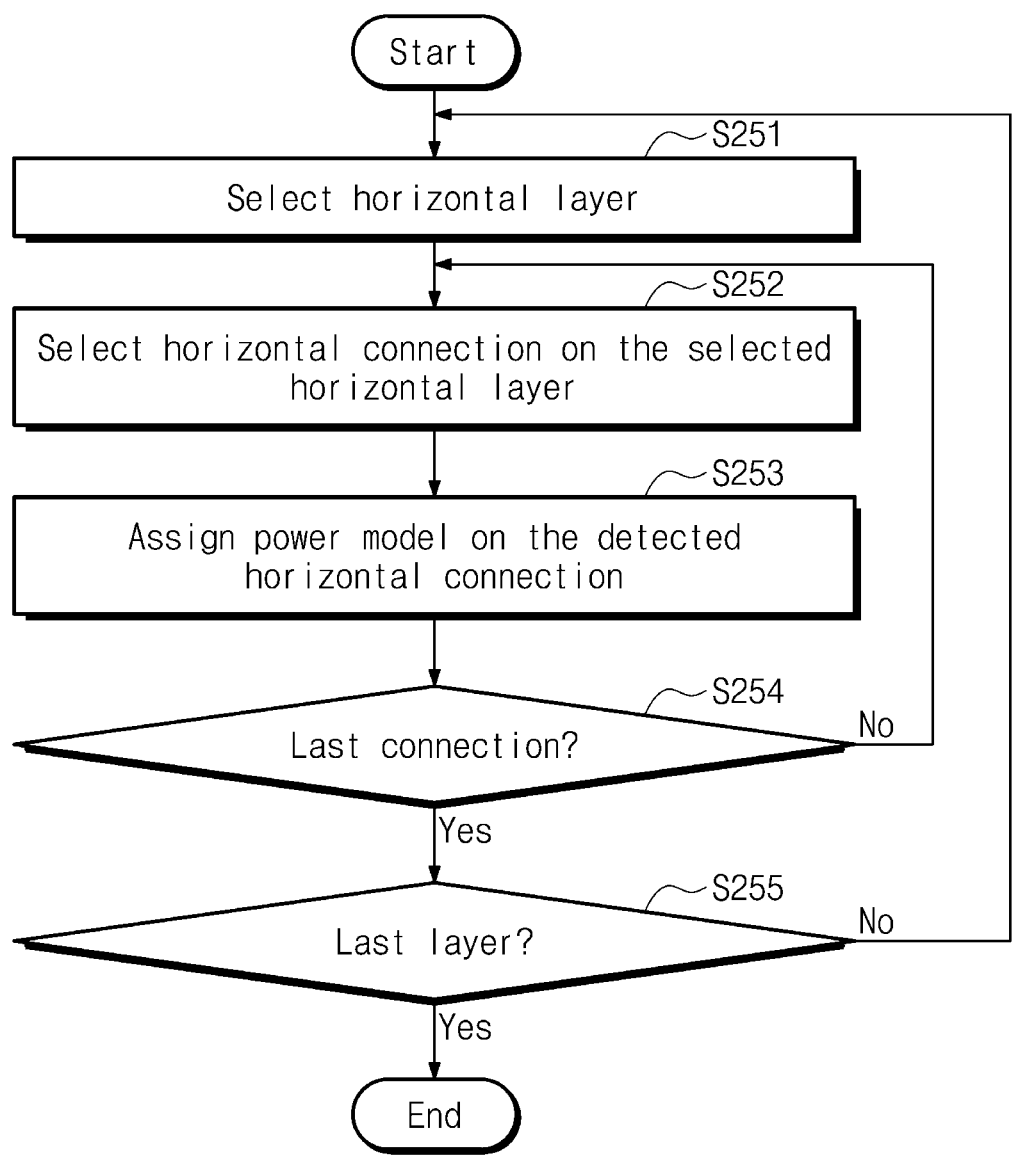
FIG. 13 illustrates an example of a step of generating a plurality of horizontal power models of FIG. 3.
Figure 14:
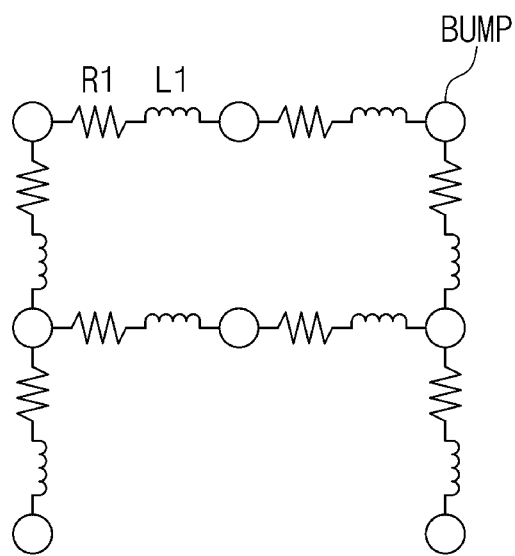
FIG. 14 illustrates an example in which an exemplary horizontal power model is generated based on a method of FIG. 13.

FIG. 13 illustrates an example of a step (step S250 of FIG. 3) of generating a plurality of horizontal power models of FIG. 3. FIG. 14 illustrates an example in which an exemplary horizontal power model is generated based on the method of FIG. 13. In an embodiment, an example where a horizontal power model corresponding to one power ball map is generated is illustrated in FIGS. 13 and 14.

Referring to FIGS. 1, 13, and 14, in step S251, the semiconductor design system 100 may select a horizontal layer. For example, the horizontal layer may include at least one horizontal connection connecting power bumps and power balls. The horizontal connection may be connections that are extended in a direction parallel to a plane of a floor plan.

For example, the horizontal layer may include the power connection map BMPk2 of FIG. 9. The semiconductor design system 100 may mange information of the power connection map BMPk2 of FIG. 9 in the form of a matrix based on the meshes of FIG. 10.

The semiconductor design system 100 may generate a meshes-based matrix, as illustrated in FIG. 10, with regard to respective horizontal layers. The semiconductor design system 100 may distinguish a mesh where a connection exists from a mesh where a connection does not exist, for each horizontal layer.

In step S252, the semiconductor design system 100 may select a horizontal connection on a selected horizontal layer. For example, a mesh corresponding to "1" may be selected from information of the matrix of FIG. 10.

In step S253, the semiconductor design system 100 may assign a power model to the detected horizontal connection. In step S254, the semiconductor design system 100 may determine if a power model has been assigned to each mesh of the selected layer. If a power model has not been assigned to every mesh of the selected layer (step S254, No), step S252 and step S253 may be repeated until a power model is assigned to the last mesh of the selected layer (step S254, Yes).

In step S255, the semiconductor design system 100 may determine if power models have been assigned for each of the horizontal layers. If power models have not been assigned to each of the horizontal layers (step S255, No), with regard to the remaining horizontal layers, step S251, step S252, and step S253 may be repeated until a power model is assigned to the last horizontal layer (step S255, Yes). For example, the remaining horizontal layers may be redistribution layers (RDLs) including horizontal connections.

In an embodiment, as illustrated in FIG. 14, because connections existing in respective meshes connecting the power bumps BUMP have the same lengths, the connections may be identically modeled to a first resistance R1 and a first inductance L1. At the remaining horizontal layers, a connection present in one mesh may also be identically modeled to the first resistance R1 and the first inductance L1.

In an embodiment, the first resistance R1 and the first inductance L1 may be obtained with reference to a library determined by a kind of a package or may be obtained by using known equations.

Figure 15:
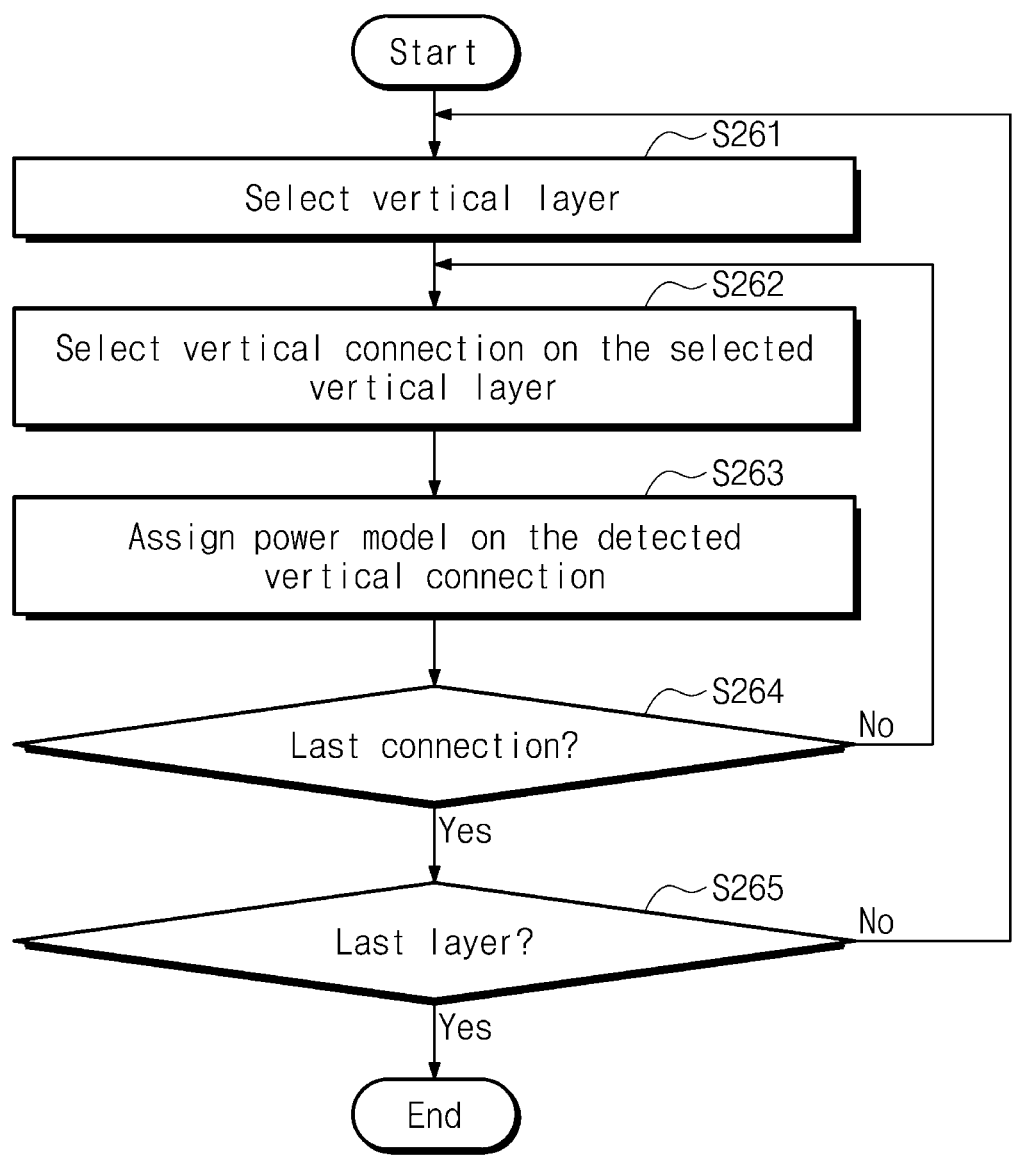
FIG. 15 illustrates an example of a step of generating a plurality of vertical power models of FIG. 3.
Figure 16:
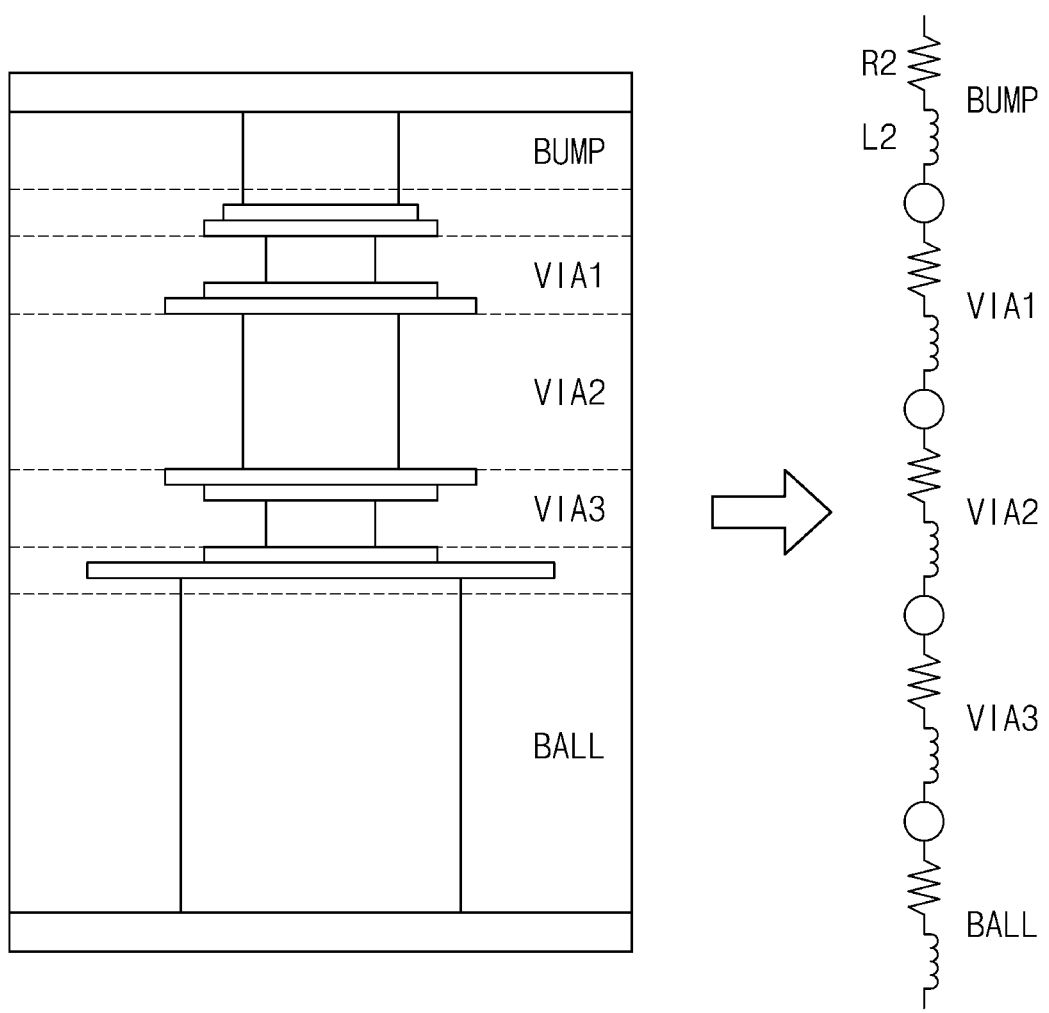
FIG. 16 illustrates an example in which an exemplary vertical power model is generated based on a method of FIG. 15.

FIG. 15 illustrates an example of a step (step S260 of FIG. 3) of generating a plurality of vertical power models of FIG. 3. FIG. 16 illustrates an example in which an exemplary vertical power model is generated based on the method of FIG. 15. In an embodiment, an example where a vertical power model corresponding to one power ball map is generated is illustrated in FIGS. 15 and 16.

Referring to FIGS. 1, 15, and 16, in step S261, the semiconductor design system 100 may select a vertical layer. For example, the vertical layer may include at least one vertical connection (e.g., at least one of vias VIA1, VIA2, and VIA3) connecting power bumps BUMP and power balls BALL. The vertical connection may be connections that are extended in a direction perpendicular to a plane of a floor plan.

The semiconductor design system 100 may generate a meshes-based matrix, as illustrated in FIG. 10, with regard to respective vertical layers. The semiconductor design system 100 may distinguish a mesh where a connection exists from a mesh where a connection does not exist, for each vertical layer.

In step S262, the semiconductor design system 100 may select a vertical connection on a selected vertical layer. For example, a mesh corresponding to "1" may be selected from meshes-based information like that illustrated in FIG. 10.

In step S263, the semiconductor design system 100 may assign a power model to the detected vertical connection. In step S264, the semiconductor design system 100 may determine if a power model to each mesh of the selected vertical layer. If a power model has not been assigned to every mesh of the selected vertical layer (step S264, No), step S262 and step S263 may be repeated until a power model is assigned to the last mesh of the selected layer (step S264, Yes).

In step S265, the semiconductor design system 100 may determine if power models have been assigned for each of the vertical layers. If power models have not been assigned to each of the vertical layers (step S265, No), with regard to the remaining vertical layers, step S262 and step S263 may be repeated until a power model is assigned to the last vertical layer (step S265, Yes).

In an embodiment, as illustrated in FIG. 16, connections existing in respective meshes connecting the power bumps BUMP may be identically modeled to a second resistance R2 and a second inductance L2. The second resistance R2 and the second inductance L2 may be differently modeled depending on a height and a thickness (or a cross-sectional area) of each of vertical connections (e.g., at least one of vias VIA1, VIA2, and VIA3).

In an example embodiment, the second resistance R2 and the second inductance L2 may be obtained with reference to a library determined by a kind of a package or may be obtained by using known equations.

FIG. 17 illustrates an exemplary power bump and ball model generated by a step (step S270 of FIG. 3) of generating a power bump and ball model of FIG. 3. Referring to FIGS. 1 and 17, horizontal layers between power bumps and power balls are modeled to horizontal power models by using the meshes-based matrix, through the processes described with reference to FIGS. 13 and 14.

Also, vertical layers between power bumps and power balls are modeled to vertical power models by using the meshes-based matrix, through the processes described with reference to FIGS. 15 and 16. The vertical power models and the horizontal power models are based on matrices of the same size.

Accordingly, a plurality of power bump and ball models connecting power bumps and power balls may be generated from the vertical power models and the horizontal power models. In an embodiment, as illustrated in FIG. 17, the plurality of power bump and ball models may be modeled in the form of a netlist NL by using SPICE.

Figure 18:
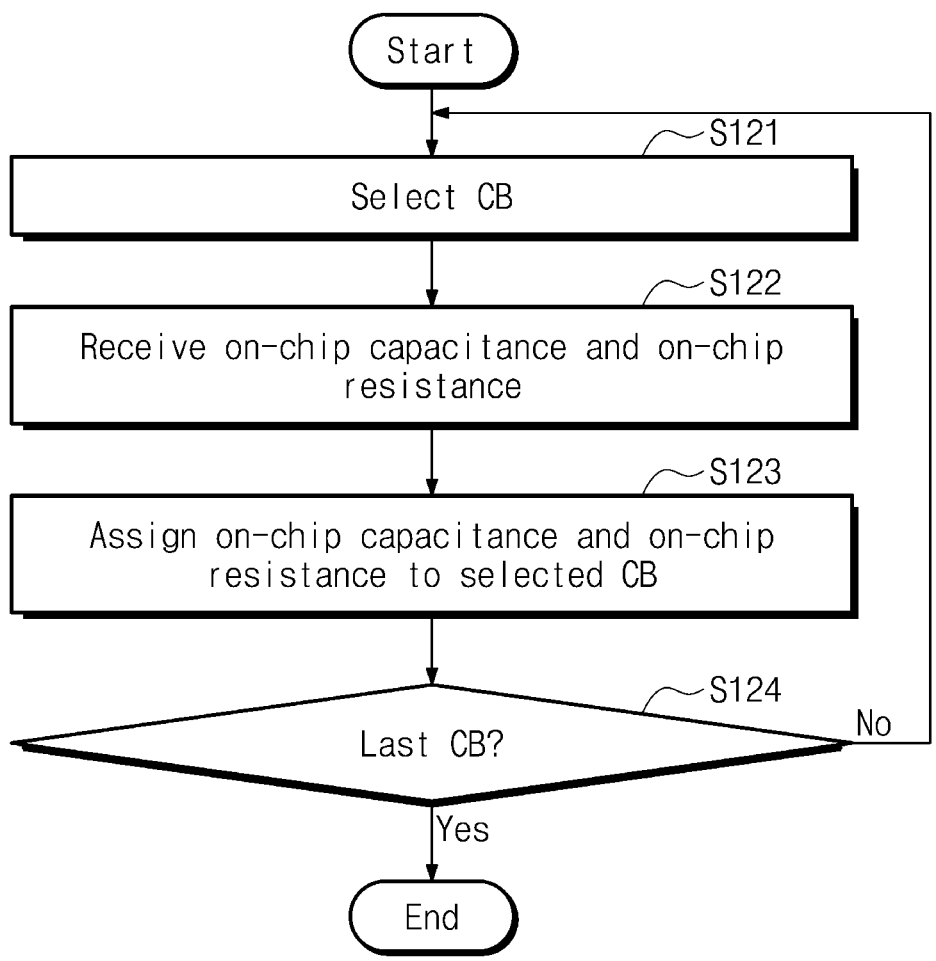
FIG. 18 illustrates an example of a step of generating a plurality of on-chip power models.

FIG. 18 illustrates an example of a step (step S120 of FIG. 2) of generating a plurality of on-chip power models. Referring to FIGS. 1 and 18, in step S121, the semiconductor design system 100 may select one circuit block CB of a plurality of circuit blocks included in floor plans.

In step S122, the semiconductor design system 100 may receive an on-chip capacitance and an on-chip resistance of the selected circuit block. For example, the semiconductor design system 100 may receive an on-chip capacitance and an on-chip resistance from a library or the user. For example, the on-chip capacitance and the on-chip resistance may include a capacitance and a resistance shown at each circuit block when viewed from a power bump.

In step S123, the semiconductor design system 100 may assign the on-chip capacitance and the on-chip resistance to the selected circuit block CB. In step S124, the semiconductor design system 100 may determine if an on-chip capacitance and an on-chip resistance have been assigned for each of the circuit blocks. If the on-chip capacitance and the on-chip resistance have not been assigned to each of the circuit blocks (step S124, No), the semiconductor design system 100 may repeat step S121 to step S123 until the on-chip capacitance and the on-chip resistance are assigned to the last circuit block (step S124, Yes).

As the methods of FIGS. 3 to 18 are performed, power models of a package level of a semiconductor device may be obtained. In an example embodiment, depending on the purpose of a semiconductor design, the semiconductor design system 100 may perform only the generations of the power bump and ball models of FIGS. 3 to 17 or may also perform the generation of the power model of the package level of FIG. 18 as well as the generations of the power bump and ball models of FIGS. 3 to 17.

Figure 19:
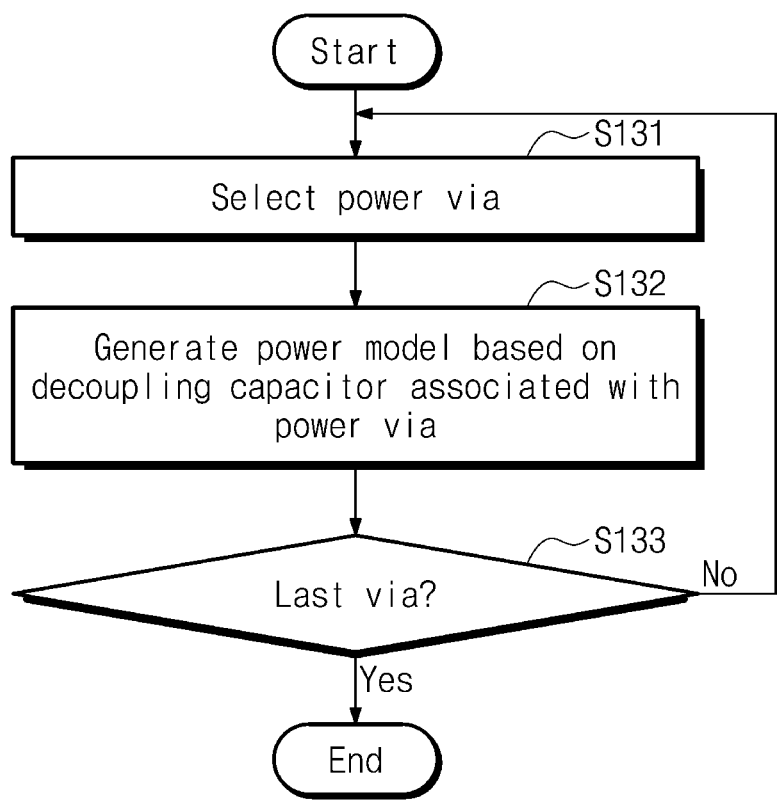
FIG. 19 illustrates an example of a step of generating a plurality of board power models.
Figure 20:
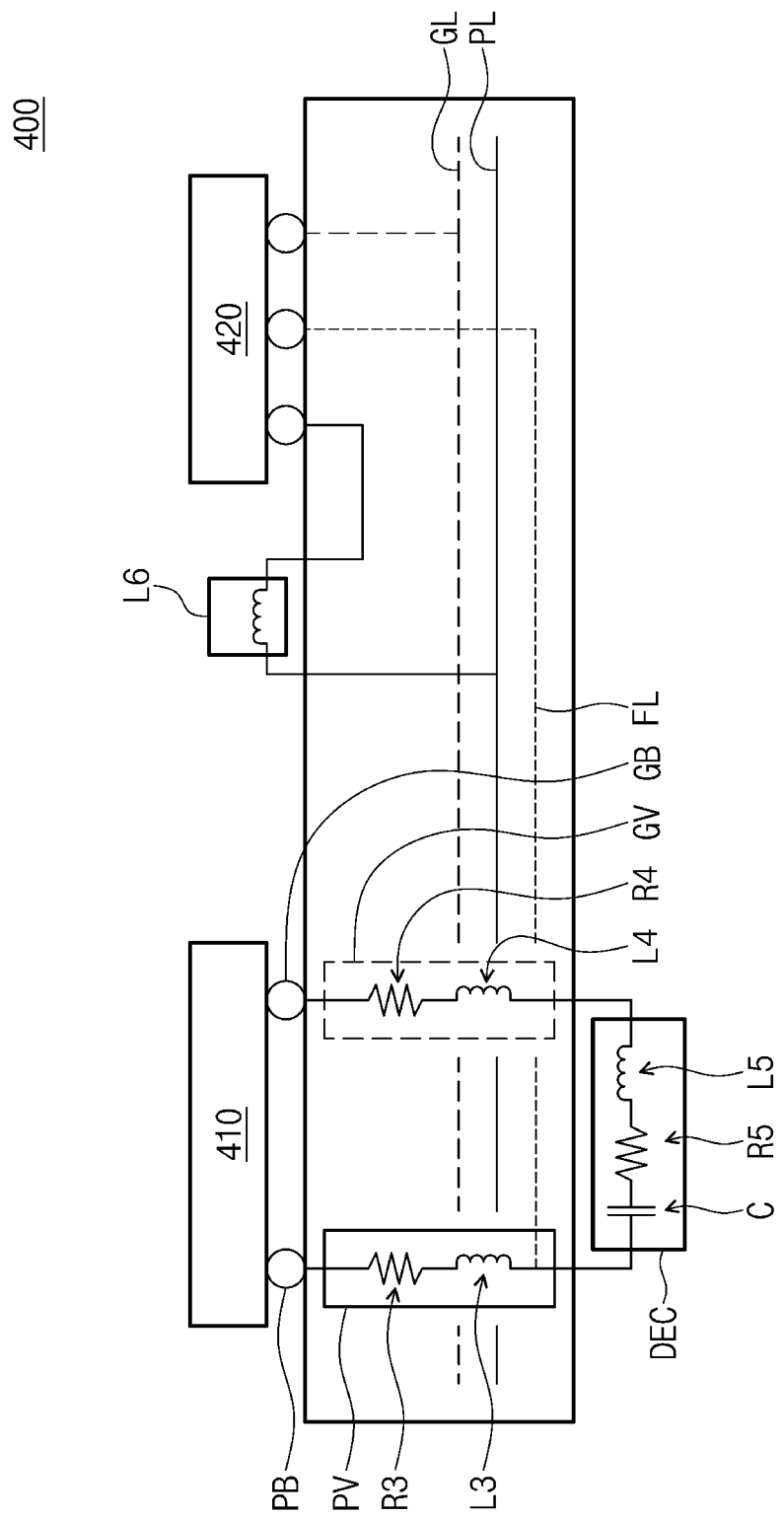
FIG. 20 illustrates an example of a board where a semiconductor package is mounted.

FIG. 19 illustrates an example of a step (step S130 of FIG. 2) of generating a plurality of board power models. FIG. 20 illustrates an example in which a semiconductor package 410 is mounted on a board 400. Referring to FIGS. 1, 19, and 20, a power ball PB and a ground ball GB of the semiconductor package 410 may be connected with a power via PV and a ground via GV of the board 400.

The semiconductor package 410 may be mounted on an upper surface of the board 400. The power via PV and the ground via GV may be connected with a decoupling capacitor DEC on a lower surface of the board 400. The power via PV may receive a power from a power management integrated circuit (PMIC) 420 through power lines PL (shown in FIG. 20 by a solid line) and a sixth inductor L6. A voltage of a specific position of the power via PV may be transferred to the PMIC 420 through a feedback line FL.

The power via PV may be modeled to a third resistance R3 and a third inductance L3. The ground via GV may be modeled to a fourth resistance R4 and a fourth inductance L4. The decoupling capacitor DEC may be modeled to a capacitor "C", a fifth resistance R5, and a fifth inductance L5. The third resistance R3 and the third inductance L3 may be modeled depending on a height and a thickness (or a cross-sectional area) of the power via PV.

The ground via GV may receive a ground voltage from the PMIC 420 through a ground line GL marked by a broken line. The fourth resistance R4 and the fourth inductance L4 may be modeled depending on a height and a thickness (or a cross-sectional area) of the ground via GV. Power models of the vias PV and GV and the decoupling capacitor DEC may be modeled, for example, with reference to a library.

Figure 21:
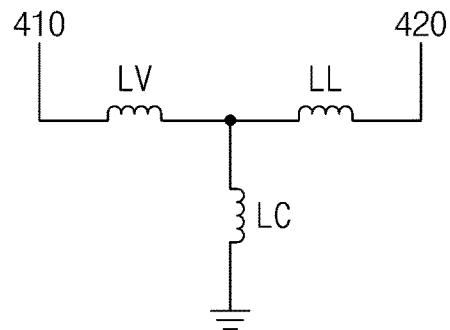
FIG. 21 illustrates an example of an effective inductance of a board.

FIG. 21 illustrates an example of an effective inductance of the board 400. Referring to FIGS. 1, 19, 20, and 21, an inductance of the board 400 may be modeled to a capacitor inductance LC that is a total sum of inductances associated with the decoupling capacitor DEC, a via inductance LV that is a total sum of inductances associated with the power via PV and is connected with the power ball PB of the semiconductor package 410, and a line inductance LL that is a total sum of inductances between the power via PV and the PMIC 420 and is connected with the PMIC 420.

In an example embodiment, the line inductance LL may be smaller than the capacitor inductance LC and the via inductance LV and thus may be ignored. For example, the inductance of the board 400 may be modeled to a sum of the capacitor inductance LC and the via inductance LV.

In an example embodiment, a board power model may be of a form where the third resistance R3, the third inductance L3, the capacitance C, the fifth resistance R5, and the fifth inductance L5 are serially connected. The via inductance LV may correspond to the third inductance L3, and the capacitor inductance LC may correspond to the fifth inductance L5.

As described above, the power model of the board 400 is formed on a via basis. Accordingly, the semiconductor design system 100 may generate a power model for each of power vias of the board 400.

In step S131, the semiconductor design system 100 may select one power via of vias of the board 400. In step S132, the semiconductor design system 100 may generate a power model of the selected via based on information of the decoupling capacitor DEC associated with the selected via and information of the board 400 (or information of a via of the board 400). For example, the information of the decoupling capacitor DEC and the information of the board 400 may be obtained from a library.

In step S133, the semiconductor design system 100 may determine if power models have been generated for all power vias. If power models have not been generated for each of the power vias (step S133, No), the semiconductor design system 100 may repeat step S131 and step S132 until power models of all power vias are generated (step S133, Yes). Step S131 and step S133 may be performed with regard to a power model of each semiconductor package. Power models of a board where a semiconductor package is mounted, that is, a system power model, may be obtained at a board level by combining board power models corresponding to the power models of the semiconductor package.

Figure 22:
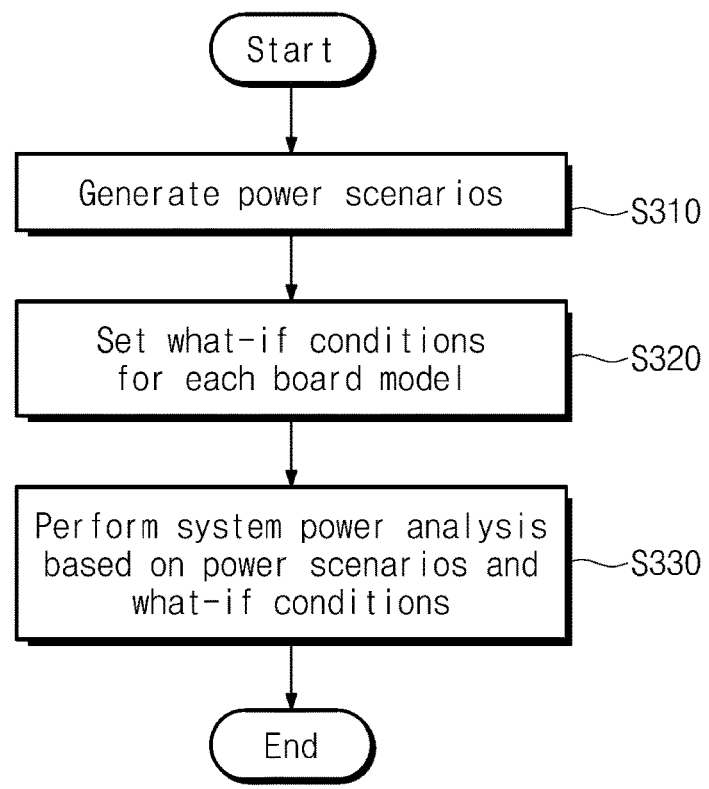
FIG. 22 illustrates an example of a step of generating a system power analysis of FIG. 2.

FIG. 22 illustrates an example of a step (step S140 of FIG. 2) of generating a system power analysis of FIG. 2. Referring to FIGS. 1 and 22, in step S310, the semiconductor design system 100 may generate power scenarios where a semiconductor package operates.

In step S320, the semiconductor design system 100 may set what-if conditions for each board model. In step S330, the semiconductor design system 100 may perform a system power analysis based on the power scenarios and the what-if conditions. For example, step S330 may correspond to (or may be included in or may be identical to) step S140 of FIG. 2.

Figure 23:
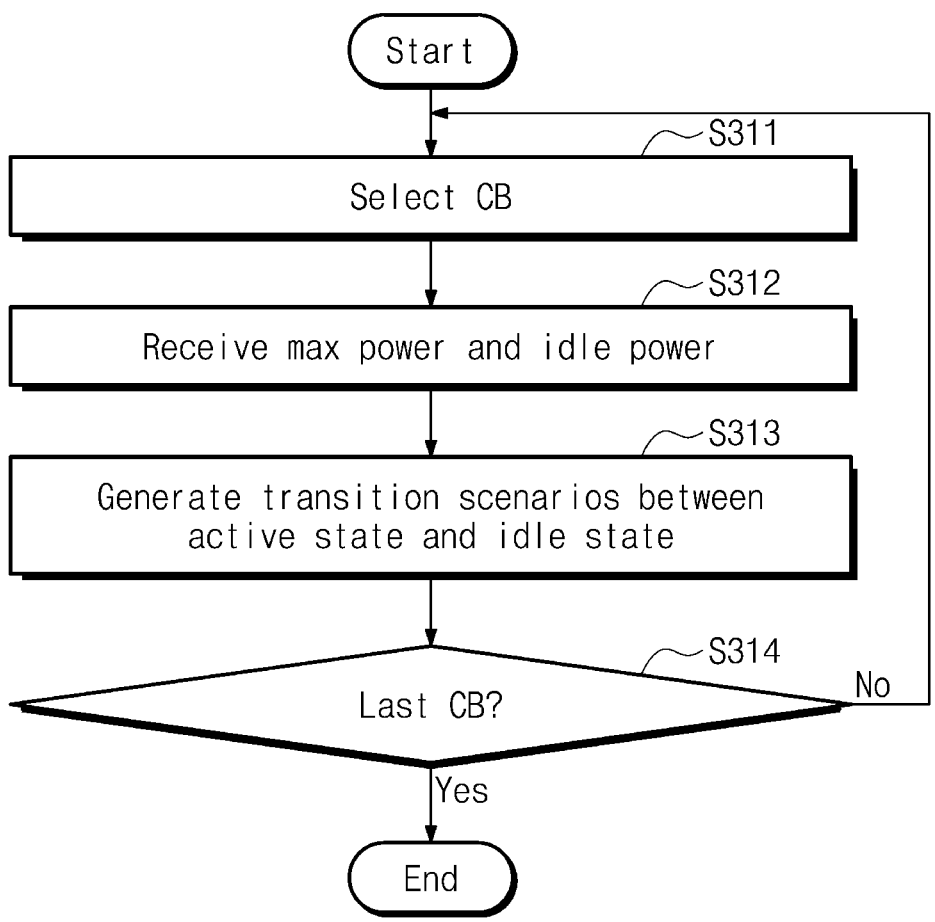
FIG. 23 illustrates an example of a step of generating power scenarios of FIG. 22.

FIG. 23 illustrates an example of a step (step S310 of FIG. 22) of generating power scenarios of FIG. 22. Referring to FIGS. 1 and 23, in step S311, the semiconductor design system 100 may select one circuit block CB of a plurality of circuit blocks. In step S312, the semiconductor design system 100 may receive a max power and an idle power of the selected circuit block CB.

In step S313, the semiconductor design system 100 may generate transition scenarios between an active state and an idle state as power scenarios. In step S314, the semiconductor design system 100 may determine if transition scenarios have been generated for all of the circuit blocks. If transition scenarios have not been generated for each of the circuit blocks (step S314, No), the semiconductor design system 100 may repeat step S311 to step S313 until the transition scenarios of all circuit blocks are generated (step S314, Yes).

In an embodiment, an example is described in FIG. 23 as a power scenario is generated for each circuit block, but one identical power scenario may be generated with respect to the whole system power model of a semiconductor package.

Figure 24:
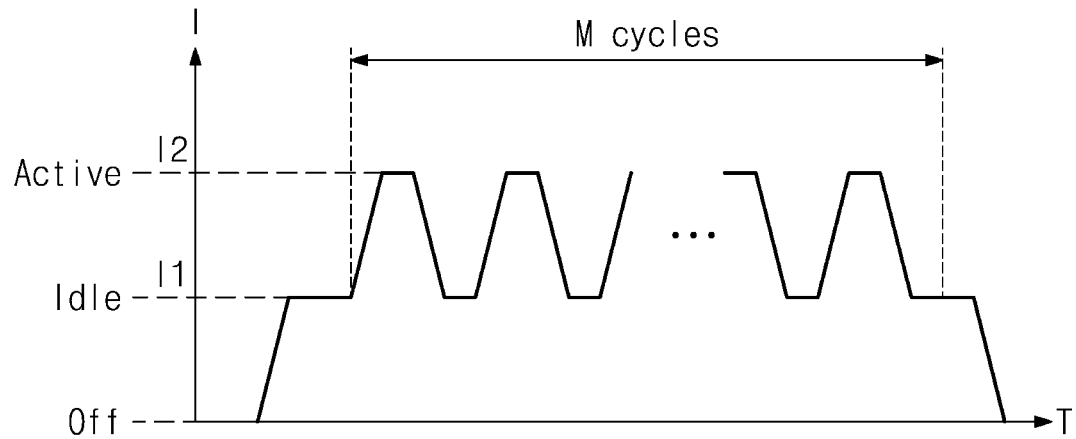
FIG. 24 illustrates an example of a power scenario generated by a method of FIG. 23.

FIG. 24 illustrates an example of a power scenario generated by the method of FIG. 23. In FIG. 24, the horizontal axis represents a time "T", and the vertical axis represents a current "I". Referring to FIGS. 1 and 24, the semiconductor design system 100 may generate a power scenario where a semiconductor package (or a circuit block) enters an idle state Idle, in which a first current I1 flows, from an off state Off where a current does not flow.

Also, after entering the idle state Idle, the semiconductor design system 100 may generate a power scenario in which the semiconductor package has "M" transition cycles each including a transition from the idle state to an active state Active, in which a second current I2 flows, and a transition from the active state Active to the idle state Idle. Also, the semiconductor design system 100 may generate a power scenario in which the semiconductor package transitions to the off state Off after the "M" transition cycles.

In an example embodiment, the semiconductor design system 100 may generate two or more different power scenarios for each system power model or for each circuit block. The two or more different power scenarios may be continuously performed, and this may be viewed as if one power scenario is performed. For example, a power scenario may be interpreted as including two or more periods in which transitions are made with different patterns.

Figure 25:
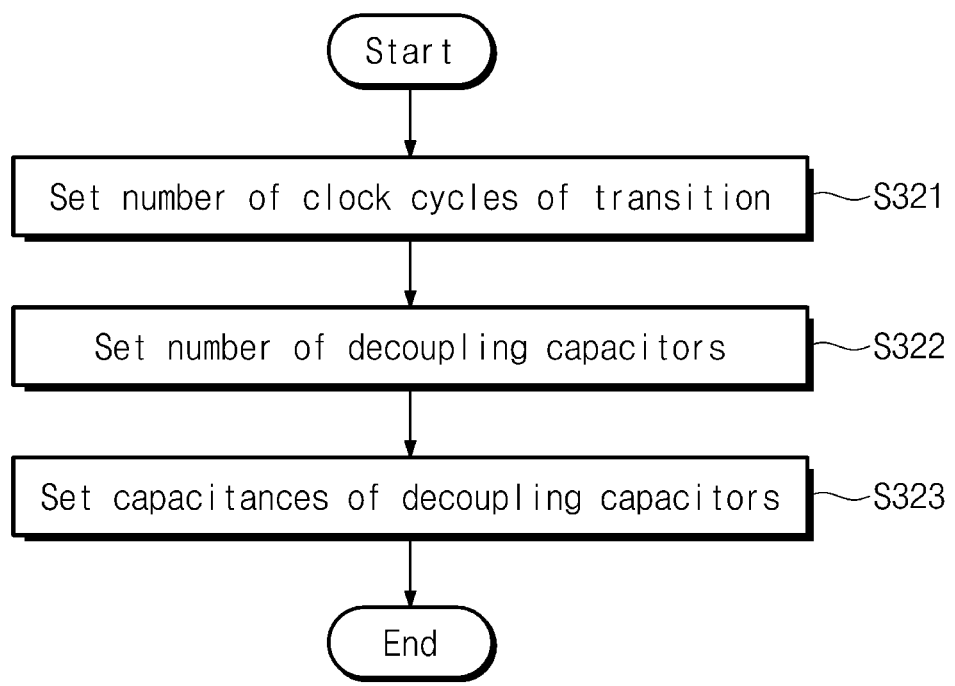
FIG. 25 illustrates an example of a step of generating what-if conditions of FIG. 22.

FIG. 25 illustrates an example of a step (step S320 of FIG. 22) of generating what-if conditions of FIG. 22. Referring to FIGS. 1 and 25, in step S321, the semiconductor design system 100 may set the number of clock cycles of a transition. For example, the semiconductor design system 100 may set the number of clock cycles necessary to enter an active state Active from an idle state Idle.

As the number of clock cycles increases, power integrity of a system power model may increase, and system performance may become better. As the number of clock cycles decreases, power integrity of a system power model may decrease, and system performance may become worse.

In step S322, the semiconductor design system 100 may set the number of decoupling capacitors. In step S323, the semiconductor design system 100 may set capacitances of the decoupling capacitors. Through step S322 and step S323, parameters associated with a decoupling capacitor of a power board model of the system power model may be adjusted.

Figure 26:
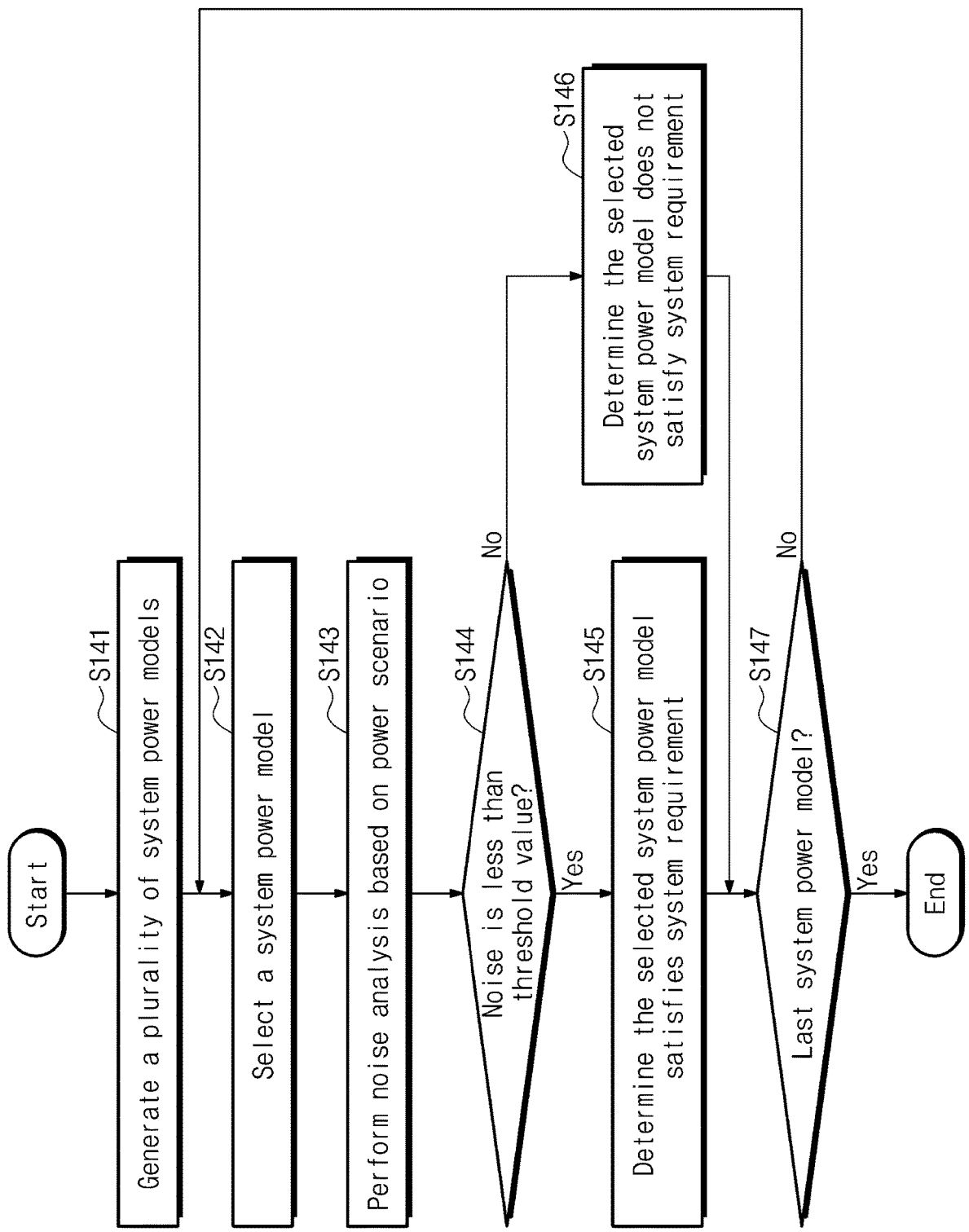
FIG. 26 illustrates an example of a step of generating a system power analysis of FIG. 2.

FIG. 26 illustrates an example of a step (step S140 of FIG. 2) of generating a system power analysis of FIG. 2. Referring to FIGS. 1 and 26, in step S141, the semiconductor design system 100 may generate a plurality of system power models. For example, the semiconductor design system 100 may generate the system power models by using a SPICE deck.

The semiconductor design system 100 may include a reference SPICE deck for various packages, such as a package-on-package (POP), a 2.5D package including an interposer, and a 3D package, in the form of a template. The semiconductor design system 100 may easily generate a system power model by selecting a kind of a package and modifying some parameters.

Figure 27:
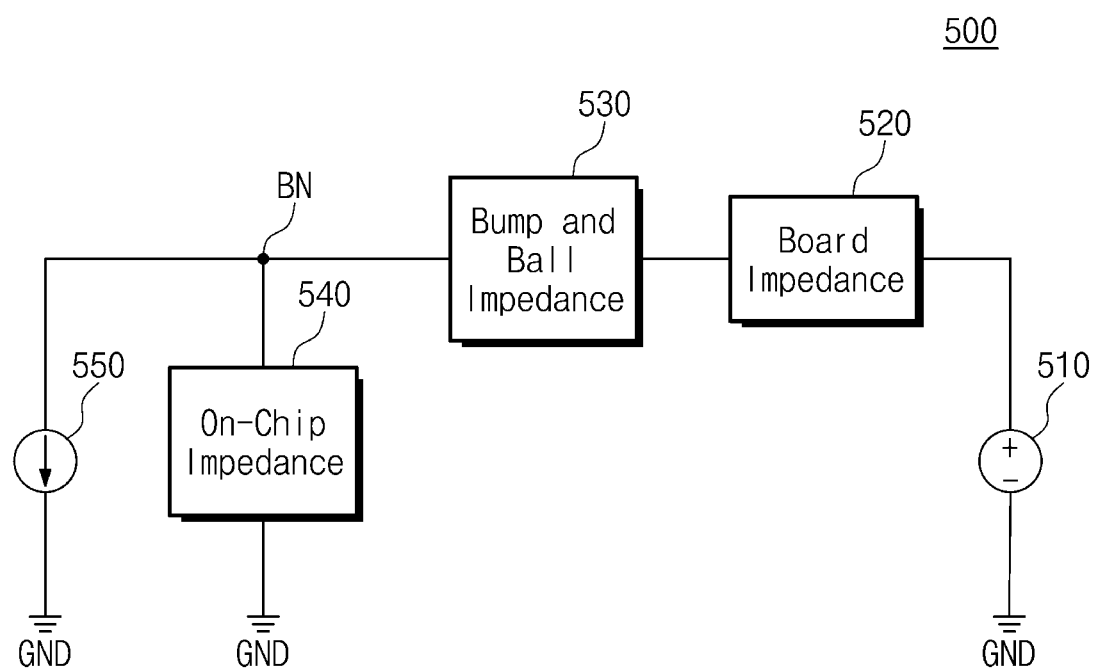
FIG. 27 illustrates an example of a system power model generated by a semiconductor design system.

FIG. 27 illustrates an example of a system power model 500 generated by the semiconductor design system 100. Referring to FIGS. 1, 20, and 27, the system power model 500 may include a voltage source 510, a board impedance 520, a bump and ball impedance 530, an on-chip impedance 540, and a current sink 550.

The voltage source 510 may be the same power supply voltage as a power supply voltage that the PMIC 420 supplies. The board impedance 520 may be an impedance of a board power model. The bump and ball impedance 530 may be an impedance of a power bump and ball model. The on-chip impedance 540 may include on-chip capacitances and on-chip resistances of circuit blocks. The current sink 550 may consume a current depending on a power scenario. A bump node BN may correspond to a power bump. A voltage of the bump node BN may be a voltage of the power bump.

Referring to FIGS. 1, 26, and 27, in step S142, the semiconductor design system 100 may select one system power model 500 of a plurality of system power models 500. In step S143, the semiconductor design system 100 may perform a noise analysis based on a power scenario. For example, the semiconductor design system 100 may monitor a change in a voltage of the bump node BN while the current sink 550 consumes a current depending on the power scenario.

In step S144, the semiconductor design system 100 may determine whether a noise is less than a threshold value. When the noise is less than the threshold value (step S144, Yes), in step S145, the semiconductor design system 100 may determine that the selected system power model 500 satisfies a system requirement. When the noise is not less than the threshold value (step S144, No), in step S146, the semiconductor design system 100 may determine that the selected system power model 500 does not satisfy the system requirement.

The semiconductor design system 100 may store a result of the determination. In step S147, the semiconductor design system 100 may determine if the noise analysis for all system power models is completed. If the noise analysis has not been completed for all of the system power models (step S147, No), the semiconductor design system 100 may repeat step S142 to step S146 until the noise analysis for all system power models is completed (step S147. Yes).

Afterwards, as described with reference to step S150 of FIG. 2, the semiconductor design system 100 may display on the display device 174 at least one system power model satisfying the system requirement to the user. The user may select an appropriate one of system power models satisfying the system requirement and may select a semiconductor layout corresponding to the selected system power model.

As described above, according to an example embodiment of the inventive concept, system power models to which a change of a floor plan is applied are generated, and a noise analysis is performed. Accordingly, a system power model and a semiconductor layout may be determined in consideration of influences of floor plans on system power models.

According to an example embodiment of the inventive concept, the generation of floor plans, the generation of power bump maps, the generation of power connection maps, the generation of power ball maps, the generation of horizontal power models, the generation of vertical power models, the generation of on-chip power models including an on-chip resistance and an on-chip capacitance, the generation of board power models, the generation of system power models, and the analyses of system power models may be performed through one tool. Accordingly, the user convenience for a semiconductor design may be increased.

In an example embodiment, the semiconductor design system 100 may also perform an analysis of a frequency domain as well as an analysis of a time domain. The semiconductor design system 100 may perform a noise analysis together with another simulation tool (e.g., an Hspice), and the semiconductor design system 100 itself may also perform a noise analysis.

In an example embodiment, the semiconductor design system 100 may perform a noise analysis by using a FFT (Fast Fourier Transform) and an IFFT (Inverse FFT). By using the FFT, the semiconductor design system 100 may generate a frequency response $Z(f)$ of an impedance of the system power model 500 and may generate a frequency response $I(f)$ of a power scenario.

The semiconductor design system 100 may generate a frequency response $V(f)$ of a voltage of the bump node BN by multiplying the frequency response $Z(f)$ of the impedance and the frequency response $I(f)$ of the power scenario together ($V(f)=Z(f)*I(f)$). The semiconductor design system 100 may obtain a time response of the voltage of the bump node BN based on the IFFT.

In an example embodiment, the semiconductor design system 100 may repeat an operation of changing what-if conditions, generating a plurality of system power models, and performing a noise analysis for each of the plurality of system power models.

In the above example embodiments, the term "constraint" and the term "information" are used to be distinguishable from each other. However, the term "constraint" and the term "information" may not be clearly distinguished from each other and may be interpreted depending on the context. For example, the "constraint" may include information about rules that an identity to be constrained has to comply with. The "information" may include a "constraint" that a specific identity has to comply with. The terms "information" and "constraint" may be relative and may be interchangeably used depending on the context.

In the above example embodiments, components according to the inventive concept are described by using the terms "first", "second", "third", and the like. However, the terms "first", "second", "third", and the like may be used to distinguish components from each other and do not limit the inventive concept. For example, the terms "first", "second", "third", and the like do not involve an order or a numerical meaning of any form.

According to the inventive concept, a floor plan is generated automatically or semi-automatically through a tool implemented with a computer system. Accordingly, user convenience may be improved. Also, because at least one is selected from power models based on various floor plans, power characteristics may be improved.

While the inventive concept has been described with reference to exemplary embodiments thereof, it will be apparent to those of ordinary skill in the art that various changes and modifications may be made thereto without departing from the spirit and scope of the inventive concept as set forth in the following claims.

What is claimed is:

1. A method implemented with a computer system executing instructions for a semiconductor design simulation, the method comprising:
   generating a plurality of floor plans, each of the plurality of floor plans including a plurality of circuit blocks placed differently;
   generating a plurality of power models from the plurality of floor plans; and
   selecting a layout corresponding to one of the plurality of floor plans by selecting at least one power model satisfying system requirements from among the plurality of power models.

2. The method of claim 1, wherein the generating of the plurality of floor plans includes:
   placing the plurality of circuit blocks in order from largest to smallest in the plurality of floor plans.

3. The method of claim 1, wherein the generating of the plurality of floor plans includes:
   placing circuits blocks having sizes larger than a threshold from among the plurality of circuit blocks prior to placing circuit blocks having sizes equal to or smaller than the threshold in the plurality of floor plans.

4. The method of claim 1, wherein the generating of the plurality of floor plans includes:
   placing a circuit block of an interface configured to communicate with an external device at an outer portion of the plurality of floor plans.

5. The method of claim 1, wherein the generating of the plurality of floor plans includes:
   placing a circuit block of a serializer and a deserializer at an outer portion of the plurality of floor plans.

6. The method of claim 1, wherein the generating of the plurality of floor plans includes:
   placing a circuit block consuming a highest power from among the plurality of circuit blocks at the center of the plurality of floor plans.

7. The method of claim 1, wherein the generating of the plurality of floor plans includes:
   placing specific circuit blocks defined by a constraint from among the plurality of circuit blocks to be spaced from each other in the plurality of floor plans by as much as a distance shorter than a specific distance defined by the constraint.

8. The method of claim 1, wherein the generating of the plurality of floor plans includes:
   discarding first floor plans each having a total size larger than a threshold; and
   generating second floor plans each having a total size equal to or smaller than the threshold as the plurality of floor plans.

9. The method of claim 1, further comprising:
   assigning a higher priority to each of the plurality of floor plans as a total size of each of the plurality of floor plans decreases; and
   displaying the plurality of floor plans through a display device based on a priority of each of the plurality of floor plans.

10. The method of claim 1, further comprising:
    displaying the plurality of floor plans on a display device;
    receiving a modification for at least one floor plan of the plurality of floor plans through an input device; and
    applying the modification to the at least one floor plan.

11. The method of claim 1,
    wherein at least a part of the instructions includes an algorithm learned based on machine learning, and
    wherein the generating of the plurality of floor plans is performed by using the algorithm.

12. A method implemented with a computer system executing instructions for a semiconductor design simulation, the method comprising:
    generating a plurality of floor plans, each of the plurality of floor plans including a plurality of circuit blocks placed differently;
    generating a plurality of power bump and ball models from the plurality of floor plans; and
    generating a plurality of board power models from the plurality of power bump and ball models.

13. The method of claim 12, further comprising:
    generating a plurality of on-chip power models from the plurality of circuit blocks.

14. The method of claim 13, further comprising:
    generating a plurality of system power models from the plurality of power bump and ball models, the plurality of on-chip power models, and the plurality of board power models;
    generating power scenarios of the plurality of system power models;
    simulating drivings of the system power models based on the power scenarios; and
    displaying at least one system power model, of which a power noise is smaller than a threshold, from among the system power models.

15. A method implemented with a computer system executing instructions for a semiconductor design simulation, the method comprising:
    generating a plurality of floor plans, each of the plurality of floor plans including a plurality of circuit blocks placed differently; and
    generating a plurality of power bump models from the plurality of circuit blocks.

16. The method of claim 15, wherein the generating of the plurality of floor plans includes:

placing power bumps of a circuit block having a preset bump map from among the plurality of circuit blocks depending on the preset bump map; and placing power bumps of a circuit block not having the preset bump map from among the plurality of circuit blocks based on a bump pitch.

17. The method of claim 15, further comprising:

connecting power bumps disposed within a distance defined by a constraint from among power bumps of the plurality of power bump models to generate power connection maps;

displaying the power connection maps through a display device based on the constraint;

receiving a modification for at least one power connection map of the power connection maps through an input device; and applying the modification to the at least one power connection map.

18. The method of claim 15, further comprising:

generating a plurality of power ball models from the plurality of power bump models.

19. The method of claim 18, wherein the generating of the plurality of power ball models includes:

identifying positions at which power balls are capable of being placed, from the plurality of power bump models; and generating the plurality of power ball models in which actual positions at which the power balls are placed, from among the positions at which power balls are capable of being placed, and a number of the power balls are different.

20. The method of claim 18, further comprising:

generating first power models of horizontal layers including horizontal connections between power bumps of the plurality of power bump models and power balls of the power ball models;

generating second power models of vertical layers including vertical connections between power bumps of the plurality of power bump models and power balls of the power ball models; and generating a plurality of power bump and ball models from the first power models and the second power models.

\* \* \* \* \*